(12) United States Patent
Wang et al.

(10) Patent No.: US 9,495,064 B2
(45) Date of Patent: Nov. 15, 2016

(54) INFORMATION PROCESSING METHOD AND ELECTRONIC DEVICE

(71) Applicants: Beijing Lenovo Software LTD., Beijing (CN); Lenovo (Beijing) Limited, Beijing (CN)

(72) Inventors: Chao Wang, Beijing (CN); Shaofeng Zhu, Beijing (CN); Jun Li, Beijing (CN)

(73) Assignees: Beijing Lenovo Software Ltd., Beijing (CN); Lenovo (Beijing) Limited, Beijing (CN)

(*) Notice: Subject to any disclaimer, the term of this patent is extended or adjusted under 35 U.S.C. 154(b) by 145 days.

(21) Appl. No.: 14/228,670

(22) Filed: Mar. 28, 2014

(65) Prior Publication Data

US 2015/0227291 A1  Aug. 13, 2015

(30) Foreign Application Priority Data

Feb. 12, 2014  (CN) .......................... 2014 1 0049150
Feb. 18, 2014  (CN) .......................... 2014 1 0055104
Feb. 24, 2014  (CN) .......................... 2014 1 0062759
Feb. 24, 2014  (CN) .......................... 2014 1 0063113

(51) Int. Cl.
*G06F 3/0481*  (2013.01)
*G09G 5/00*  (2006.01)
*G06F 9/44*  (2006.01)

(52) U.S. Cl.
CPC ........... *G06F 3/0481* (2013.01); *G06F 9/4443* (2013.01); *G09G 5/00* (2013.01); *G06F 2203/04805* (2013.01)

(58) Field of Classification Search
CPC ............... G06F 3/0481; G06F 9/4443; G06F 2203/04805
See application file for complete search history.

(56) References Cited

U.S. PATENT DOCUMENTS

2008/0130966 A1*  6/2008  Crucs .................... G06F 19/321
                                                       382/128
2009/0327893 A1*  12/2009  Terry .................... G06F 3/1438
                                                       715/719
2012/0289290 A1*  11/2012  Chae .................... G06F 3/0488
                                                       455/566

* cited by examiner

*Primary Examiner* — Ariel Balaoing
(74) *Attorney, Agent, or Firm* — Westman, Champlin & Koehler, P.A.

(57) ABSTRACT

An information processing method is performed using an electronic device, which includes a touch-sensitive display unit and is capable of executing at least one application. The touch-sensitive display unit is capable of displaying at least one window, which includes a full-screen window and/or a non-full-screen window smaller than the full-screen window. In the method, a first window is displayed on the touch-sensitive display unit according to a first operation, and a first application is started and executed in the first window; a second window is displayed on the touch-sensitive display unit according to a second operation, and a second application is started and executed in the second window; in response to detecting that the first window and the second window are in a predetermined relationship and/or that the first application and the second application are in a predetermined relationship, interaction between the first window and the second window is enabled.

14 Claims, 8 Drawing Sheets

INFORMATION PROCESSING METHOD AND ELECTRONIC DEVICE

CROSS-REFERENCE TO RELATED APPLICATION

This Application is a non-provisional Application of Chinese Application Nos. CN 201410049150.1, filed Feb. 12, 2014, CN 201410055104.2, filed Feb. 18, 2014, CN 201410063113.6, filed Feb. 24, 2014 and CN 201410062759.2, filed Feb. 24, 2014, in Chinese, the contents of which are hereby incorporated by reference in their entirety.

TECHNICAL FIELD

The present invention relates to communication technology, and more particularly, to information processing methods and electronic devices.

BACKGROUND

The inventors of the present application found at least the following problems with the related technology in the process of implementing solutions according to embodiments of the present application.

At present, electronic devices, especially mobile phones, small tablet computers etc. have been widely used in people's daily life. With the development of electronic technology and multi-window display technology, a user can start and use an application not only in a form of full-screen window, but also in a form of windowlet (i.e., non-full-screen window). Multiple applications can be started and used in a form of multiple windowlets at the same time.

In the above electronic devices supporting multi-window multi-application functions, applications started and used in various windows are executed independently of each other. This cannot satisfy users' needs for multi-window multi-application interaction. For example, if data is to be transferred between multiple windowlets, a user may have to perform multiple operations to implement the data transfer, thus affecting the user's experience. In addition, when multiple applications are displayed simultaneously in a form of multiple full-screen windows or multiple non-full-screen windows on a display unit of an electronic device, there is no solution in the art to exchange contents of two non-full-screen windows quickly and conveniently so as to reduce the time required for operation and enhance the user's experience. Moreover, sometimes a user may be interested in only part of contents in the window. As an example, some applications display advertisement contents at the top or bottom of the window, but a user may not want to see the advertisement contents. As another example, when a user plays a puzzle game in a puzzle application, contents of the whole puzzle are displayed in the window by the puzzle application, but the user may be interested in only some area of the puzzle game. The existing window technology is unable to present contents according to users' needs.

SUMMARY

The embodiments of the present invention provide information process methods and electronic devices capable of implementing multi-window multi-application interaction.

An information processing method according to an embodiment of the present invention is applied in an electronic device. The electronic device includes a touch-sensitive display unit and is capable of executing at least one application. The touch-sensitive display unit is capable of displaying at least one window, which includes a full-screen window and/or a non-full-screen window smaller than the full-screen window. The non-full-screen window is obtained by transforming the full-screen window using a transform parameter. The method includes: displaying a first window on the touch-sensitive display unit according to a first operation, and starting and executing a first application in the first window; displaying a second window on the touch-sensitive display unit according to a second operation, and starting and executing a second application in the second window; and in response to detecting that the first window and the second window are in a predetermined relationship and/or that the first application and the second application are in a predetermined relationship, enabling interaction between the first window and the second window.

An information processing method according to an embodiment of the present invention is applied in an electronic device. The electronic device includes a touch-sensitive display unit and is capable of executing at least one application. The touch-sensitive display unit is capable of displaying at least one window, which includes a full-screen window and/or a non-full-screen window smaller than the full-screen window. The non-full-screen window is obtained by transforming the full-screen window using a transform parameter. The method includes: acquiring first information in a first non-full-screen window according to a first operation in the first non-full-screen window; in response to a second operation on the first information, copying or moving the first information from the first non-full-screen window to the second non-full-screen window; determining whether the second non-full-screen window satisfies a preset condition; and processing the first information in the second non-full-screen window upon determining that the second non-full-screen window satisfies the preset condition.

An information processing method according to an embodiment of the present invention is applied in an electronic device. The electronic device includes a touch-sensitive display unit and is capable of executing at least one application, so that the application is displayed in a full-screen window or a non-full-screen window smaller than the full-screen window on the touch-sensitive display unit. The touch-sensitive display unit is capable of displaying at least two non-full-screen windows simultaneously, which are obtained by transforming the full-screen window using a transform parameter. The method includes: determining two target windows corresponding to a first operation on the touch-sensitive display unit, at least one of the two target windows being a non-full-screen window; judging whether the first operation satisfies a preset condition, and when the first operation satisfies the preset condition, determining a first transform parameter according to the first target window among the two target windows, and determining a second transform parameter according to the second target window among the two target windows; transforming the second target window into a third window for substituting the second target window using the first transform parameter, so that content of the second target window is displayed in the third window; and transforming the first target window into a fourth window for substituting the first target window using the second transform parameter, so that content of the first target window is displayed in the fourth window.

An information processing method according to an embodiment of the present invention is applied in an electronic device. The electronic device includes a touch-sensitive display unit, and is capable of executing at least one application, which is displayed in a first window on the touch-sensitive display unit, and the first window is a full-screen window or a non-full-screen window smaller than the full-screen window. The method includes: generating a first instruction for splitting the first window into a second non-full-screen window and a third non-full-screen window based on a first operation; in response to the first instruction, transforming the first window into the second non-full-screen window using a first transform parameter and transforming the first window into the third non-full-screen window using a second transform parameter, wherein both the second non-full-screen window and the third non-full-screen window are smaller than the full-screen window; and displaying first content of the application in the second non-full-screen window on the touch-sensitive display unit and displaying second content of the application in the third non-full-screen window on the touch-sensitive display unit, wherein interaction is allowed between the second non-full-screen window and the third non-full-screen window.

An electronic device according to an embodiment of the present invention includes a touch-sensitive display unit and a processor. The processor is capable of executing at least one application and the touch-sensitive display unit is capable of displaying at least one window, which includes a full-screen window and/or a non-full-screen window smaller than the full-screen window, and the non-full-screen window is obtained by transforming the full-screen window using a transform parameter. The processor is configured to: display a first window on the touch-sensitive display unit according to a first operation, and start and execute a first application in the first window; display a second window on the touch-sensitive display unit according to a second operation, and start and execute a second application in the second window; and in response to detecting that the first window and the second window are in a predetermined relationship and/or that the first application and the second application are in a predetermined relationship, enable interaction between the first window and the second window.

An electronic device according to an embodiment of the present invention includes a touch-sensitive display unit. The electronic device is capable of executing an application which is displayed in a first window on the touch-sensitive display unit, and the first window is a full-screen window or a non-full-screen window smaller than the full-screen window. The electronic device further includes a processor, configured to: generate a first instruction for splitting the first window into a second non-full-screen window and a third non-full-screen window based on a first operation; in response to the first instruction, transform the first window into the second non-full-screen window using a first transform parameter and transform the first window into the third non-full-screen window using a second transform parameter, wherein, both the second non-full-screen window and the third non-full-screen window are smaller than the full-screen window; and control the touch-sensitive display unit to display first content of the application in the second non-full-screen window and display second content of the application in the third non-full-screen window, wherein interaction is allowed between the second non-full-screen window and the third non-full-screen window.

With the embodiments of the present invention, multi-window multi-application interaction can be implemented. For example, a user is enabled to directly move or copy the selected first information from a first non-full-screen window to a second non-full-screen window, and thus quickly implements data transfer between multiple windowlets. In addition, when the user performs an operation, the electronic device can be caused to exchange content of the two target windows for display, thus satisfying the user's need for exchanging contents of the windows for display in some particular scenario. Moreover, the user can conveniently select content of interest and display it in separate non-full-screen windows by displaying different parts of the content of the application in different non-full-screen windows. There features satisfy users' needs, and the operations are quick and convenient, thus enhancing user experience.

DETAILED DESCRIPTION OF THE EMBODIMENTS

The implementation of the solutions will be further described in detail below in conjunction with accompanying drawings. The following embodiments will be described by taking a touch-sensitive display unit as an example of the display unit.

First Method Embodiment

Figure 1:
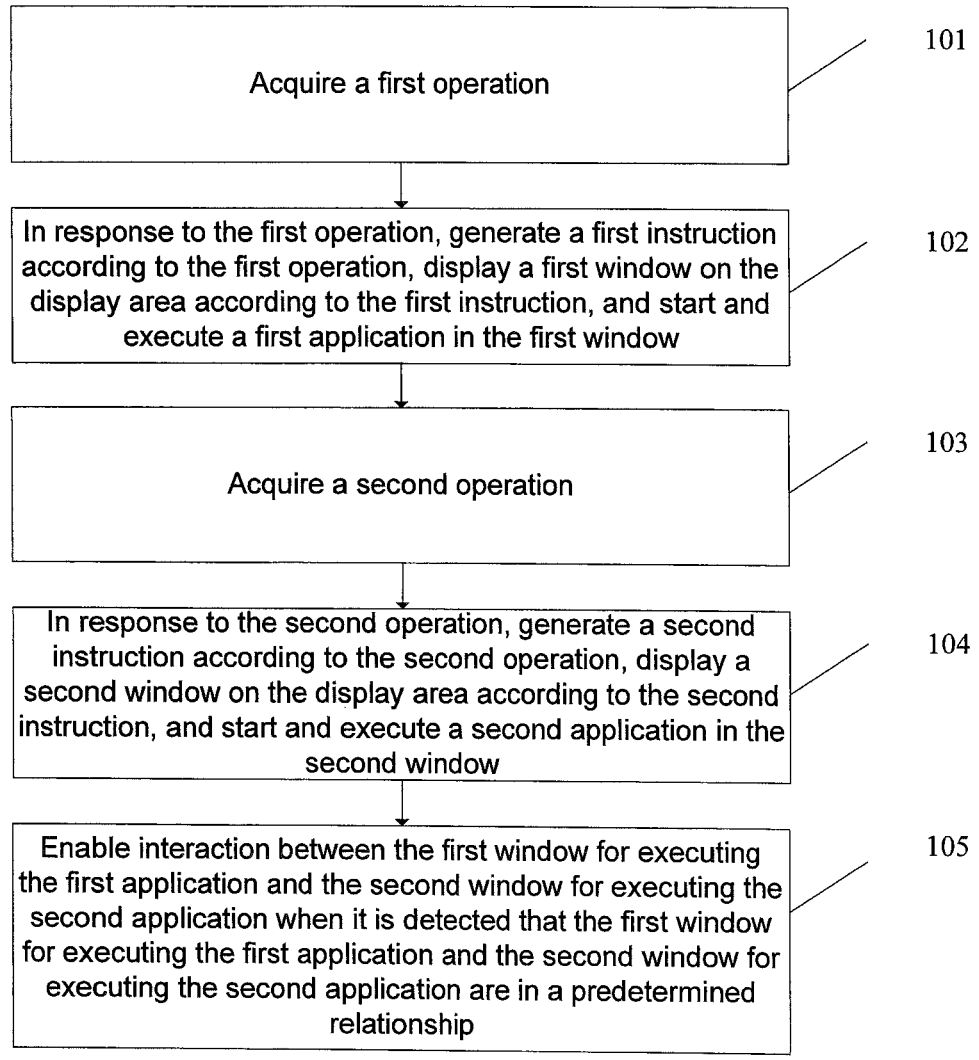
FIG. 1 is a schematic flowchart showing an implementation of a method embodiment of the present invention.

An information processing method according to an embodiment of the present invention is applied in an electronic device. The electronic device includes a touch-sensitive display unit including a display area, and is capable of executing multiple applications and displaying the multiple applications in multiple windows at the same time. The multiple windows each include a windowlet and/or a full-screen window. The windowlet is smaller than the full-screen window and is obtained by transforming the full-screen window using a transform parameter. As shown in FIG. 1, the method includes:

Step 101: acquiring a first operation.

Step 102: in response to the first operation, generating a first instruction according to the first operation, displaying a first window on the display area according to the first instruction, and starting and executing a first application in the first window.

Step 103: acquiring a second operation.

Step 104: in response to the second operation, generating a second instruction according to the second operation, displaying a second window on the display area according to the second instruction, and starting and executing a second application in the second window.

Step 105: enabling interaction between the first window and the second window upon detecting that the first window and the second window are in a predetermined relationship.

To be noted, according to an embodiment of the present invention, the first window and the second window may run in parallel. A first application is executed in the first window on the touch-sensitive display unit, and a second application is executed in the second window on the touch-sensitive display unit. When the relationship between the first window for executing the first application and the second window for executing the second application satisfies a predetermined condition, for example, when the relationship between the two windows (for example, the two windows overlap) is a predetermined relationship, and interaction between the two windows is made possible, or the relationship between applications (such as a magnifier application and a map application) in the two windows is a predetermined relationship, and interaction between the two windows is made possible, the first application executed in the first window and the second application executed in the second window are able to interact with each other.

According to the embodiment of the present invention, the first window and the second window may be in a derivation relationship. That is, after a first window is opened, a second window is opened based on an operation in the first window (the operation includes an active operation by the user, or a passive operation caused by a window event). Then, interaction may be performed between the first window and the second window.

To be noted, in multiple windows, a windowlet is smaller than a full-screen window, and is obtained by transforming the full-screen window using a transform parameter. The transform parameter is at least one of a parameter value, a matrix, a group of parameters, or a set of parameters.

The first application, the windowlet and the full-screen window in the multiple windows, and the principle of obtaining the windowlet by transforming the full-screen window using the transform parameter are described as follows. In the following embodiments of the present invention, description related to these terms and the principle of window transform will be omitted.

In the embodiment of the present invention, the first application installed in the electronic device may be an application built in the electronic device system, for example, a clock application, a calculator application, a camera application, and an address book application, or may be a third-party application installed by a user, for example, a game application, a WeChat application, a browser application, an instant chat application, a mail application etc.

In general, each of the first applications is displayed in a form of an interactive object on the desktop of the electronic device and corresponds to one interactive object. The interactive object may be an object logo, which is generally an icon. A first application corresponding to an object logo of the first application may be started by operating the object logo. For example, on the desktop of the electronic device such as a mobile phone, when a user touches an icon of the address book application, the address book application may be started, to enable the address book recorded in the address book application to be displayed on the display screen of the electronic device. When the first application is started through the desktop, the first application will be displayed in a form of full-screen window on the display screen of the electronic device.

In the embodiment of the present invention, the transform parameter may be pre-stored in a database of the electronic device. For example, in practical applications, the transform parameter may be represented in a form of matrix, or in a form of a group of parameters. Each of the parameters in the group may be a numerical value, or a vector. In the following, the transform parameter will be represented in a form of a matrix, and thus defined as a first matrix in the embodiment of the present invention. The first matrix may be pre-stored in a matrix function library of the electronic device. The full-screen window of the first application may be transformed into a windowlet using the first matrix. For example, transforms such as scale-down, translation and shape transform may be applied to the full-screen window to convert the full-screen window into a windowlet.

Graphical buffer data of the first application in the full-screen window may be transformed into graphical buffer data of the first application in the windowlet using the first matrix. With the transform of the graphical buffer data in the full-screen window, a display effect can be achieved that the full-screen window of the first application is scaled down to a windowlet, and thus the first application is displayed in the windowlet on the display screen of the electronic device. Meanwhile, the first matrix may also be used to perform, for example, a translation transform, a shape transform, or an angle transform on the windowlet.

Preferably, the first matrix may be preset by a manufacturer of the electronic device, or may be set manually by a user on the electronic device. In order to facilitate the user in setting the first matrix manually, the electronic device provides a function of automatically generating a matrix. The user may simply set certain parameters related to the first matrix, for example, a window horizontal coordinate scale parameter, a window longitudinal coordinate scale parameter, a window translation parameter, a window shape parameter, and a window angle rotation parameter, and then the electronic device may generate a corresponding first matrix based on these parameters.

Here, a scale transform and a rotation transform may be performed on the full-screen window of the first application using the first matrix through Equation (1a):

$$\begin{pmatrix} x_2 \\ y_2 \\ z_2 \end{pmatrix} = \begin{pmatrix} M_{11} & M_{12} & M_{13} \\ M_{21} & M_{22} & M_{23} \\ M_{31} & M_{32} & M_{33} \end{pmatrix} \times \begin{pmatrix} x_1 \\ y_1 \\ z_1 \end{pmatrix} \quad (1a)$$

In Equation (1a), $$\begin{pmatrix} x_2 \\ y_2 \\ z_2 \end{pmatrix}$$

is a coordinate vector of a windowlet, where $x_2$ is a horizontal coordinate of the windowlet, $y_2$ is a longitudinal coordinate of the windowlet, $z_2$ is generally set to 1 by default;

$$V = \begin{pmatrix} M_{11} & M_{12} & M_{13} \\ M_{21} & M_{22} & M_{23} \\ M_{31} & M_{32} & M_{33} \end{pmatrix},$$

where V represents the first matrix of a 3×3 size, $M_{ij}$ represents an element at the $i^{th}$ row and the $j^{th}$ column of the first matrix, a value of i is 1, 2 or 3, and a value of j is 1, 2 or 3; and $$\begin{pmatrix} x_1 \\ y_1 \\ z_1 \end{pmatrix}$$

represents a coordinate vector of a full-screen window, where $x_1$ is a horizontal coordinate of the full-screen window, $y_1$ is a longitudinal coordinate of the full-screen window, and $z_1$ is generally set to 1 by default.

When the scale transform is performed on the full-screen window using Equation (1a), 4 elements in $M_{ij}$ may be set as $M_{11}=\alpha$, $M_{12}=0$, $M_{21}=0$, $M_{22}=\beta$, and the other 5 elements may be set randomly. Then, Equation (2a) may be derived by substituting the parameters set above into Equation (1a):

$$x_2 = \alpha \times x_1$$

$$y_2 = \beta \times y_1 \quad (2a)$$

where $\alpha$ is a horizontal coordinate scale parameter, and $\beta$ is a longitudinal coordinate scale parameter.

When a clockwise rotation transform is performed on the full-screen window using Equation (1a), 4 elements in $M_{ij}$ may be set as $M_{11}=\cos\theta$, $M_{12}=\sin\theta$, $M_{21}=-\sin\theta$, $M_{22}=\cos\theta$, and the other 5 elements may be set randomly. Then, Equation (3a) may be derived by substituting the parameters set above into Equation (1a):

$$x_2 = \cos\theta \times x_1 + \sin\theta \times y_1$$

$$y_2 = -\sin\theta \times x_1 + \cos\theta \times y_1 \quad (3a)$$

where $\theta$ is a rotation angle.

A translation transform may be performed on the full-screen window of the first application using the first matrix through Equation (4a):

$$\begin{pmatrix} x_2 \\ y_2 \\ z_2 \end{pmatrix} = \begin{pmatrix} M_{11} \\ M_{21} \\ M_{31} \end{pmatrix} + \begin{pmatrix} x_1 \\ y_1 \\ z_1 \end{pmatrix} \quad (4a)$$

When the translation transform is performed on the full-screen window using Equation (4a), 3 elements in $M_{ij}$ may be set as $M_{11}=a$, $M_{21}=b$, $M_{31}=0$. Then, Equation (5a) may be derived by substituting the parameters set above into Equation (4a):

$$x_2 = a + x_1$$

$$y_2 = b + y_1 \quad (5a)$$

where a is a horizontal coordinate translation parameter, and b is a longitudinal coordinate translation parameter.

In the above schemes, there may be multiple coordinate vectors of the full-screen window, and each coordinate vector corresponds to a position of one pixel. Similarly, there may be multiple coordinate vectors of the windowlet, and the number of the coordinate vectors of the windowlet corresponds to that of the full-screen window. Each coordinate vector of the windowlet also corresponds to a position of one pixel which is a corresponding pixel of the full-screen window.

In practical implementations, the respective elements in the first matrix may be set as some other values, so that the full-screen window can be transformed into a desired windowlet. Further, if required, the respective elements in the first matrix may be set in such a manner that scale, translation and rotation operations can be performed simultaneously on the full-screen window.

In the embodiment of the present invention, the first matrix V may be another square matrix, for example, a 4×4 square matrix. Those skilled in the art can change the dimension of the square matrix according to practical requirements, and detailed description will be omitted here.

Second Method Embodiment

The difference between the information processing method according to the second embodiment of the present invention and the information processing method according to the first embodiment of the present invention is that interaction between the first window and the second window may specifically include controlling, by the first window, to change a display of content in the second window to implement the interaction. A scenario of implementing the interaction according to the embodiment of the present invention is that one of the windows is for control, and the other window is for display. For example, this interaction scenario is a master-slave scenario, i.e., the control party is master, and the display party is slave. Data processing in the first window for control may be used to change a display of data in the second window.

In a preferred embodiment, controlling, by the first window, to change a display of content in the second window includes:

acquiring data of a first application executed in the first window, and processing the acquired data of the first application according to a preset condition; transmitting the processed data to a second application executed in the second window, to control a display of the second application executed in the second window; and displaying, by the second application executed in the second window, new content according the processed data.

In a preferred embodiment, the method further includes triggering an interaction by detecting whether the first window and the second window are in a predetermined relationship and/or detecting whether the first application and the second application are in a predetermined relationship. In an example, detecting whether the first window and the second window are in a predetermined relationship is usually performed in a scenario where two windows have some kind of relationship. When there is an overlap area between the first and second windows on the touch-sensitive display unit, the predetermined relationship is satisfied to trigger the interaction. That is, the interaction is enabled only when the windows overlap. If the windows become non-overlap, the initial state is restored.

In an example, detecting whether the first application and the second application are in a predetermined relationship is usually performed in a scenario where the applications in two windows have some kind of relationship, such as the magnifier application and the map application in the first method embodiment as described above. Detailed description thereof will be omitted here.

In a preferred implementation, the two windows of interaction may be both windowlets, or one is a windowlet, and the other is a full-screen window. The two applications of interaction may be different applications, or application instances related to a single application.

Third Method Embodiment

The difference between the information processing method according to the third embodiment of the present invention and the information processing method according to the first embodiment of the present invention is that interaction between the first window and the second window may specifically include, upon detecting that the first and second windows are in a predetermined relationship, enabling data exchange between the first and second windows to implement the interaction.

A scenario of implementing the interaction according to the embodiment of the present invention is that there are interaction scenes for data exchange in the two windows, such as playing a game.

In a preferred implementation, data exchange between the first and second windows may be performed in the following three schemes.

First scheme: acquiring data of the first application executed in the first window, and processing the acquired data of the first application; transmitting the processed data to the second application executed in the second window; and executing the second application in the second window according to the processed data.

Second scheme: acquiring data of the second application executed in the second window, and processing the acquired data of the second application; transmitting the processed data to the first application executed in the first window; and executing the first application in the first window according to the processed data.

It should be noted that the above first and second schemes describe scenarios of one-way interaction, and the third scheme described below is a scenario of two-way interaction.

Third scheme: acquiring data of the first application executed in the first window, and processing the acquired data of the first application; transmitting the processed data to the second application executed in the second window; and executing the second application in the second window according to the processed data; and correspondingly, acquiring data of the second application executed in the second window, and processing the acquired data of the second application; transmitting the processed data to the first application executed in the first window; and executing the first application in the first window according to the processed data.

The Embodiments of the Present Invention Will be Described Below Using Specific Application Scenarios First scenario: an interaction is implemented according to the above second method embodiment of the present invention. This scenario is an interaction scenario of using one of two windows for control and using the other for display.

I. Interaction is triggered when a relationship between the two windows satisfies a predetermined condition.

Initially, a first application is executed in the first window on the touch-sensitive display unit, and a second application is executed in the second window on the touch-sensitive display unit. When the first window for executing the first application and the second window for executing the second application are in a predetermined relationship, i.e., the relationship between the two windows satisfies a predetermined condition, and interaction between the two windows are made possible, an interaction is triggered. For example, the interaction is triggered by overlapping of the windows.

Then, the first window for executing the first application controls to change a display of content in the second window for executing the second application, so as to implement the interaction.

The first window for executing the first application controlling to change a display of content in the second window for executing the second application will be described below by using specific examples.

First Example:

The first window is a window A for executing a photoshop application. The photoshop application is used to display a nostalgia filter in the window A and to process data, so as to achieve a nostalgic effect.

The second window is a window B for executing an image display application. The image display application is used to display an image in the window B.

When the window A is moved to and overlapped with the window B, the photoshop application executed in the window A acquires image data of the window B, performs image edition on the image data of the window B, and transmits the edited data to the window B. The image display application executed in the window B displays a new image according to the edited data, so as to achieve the nostalgic effect. The result of the interaction is that the nostalgic style effected by the processing of the photoshop application is added to the original image content displayed in the window B.

Second Example:

The first window is a window A for executing an image display application. The image display application is used to display a portrait image in the window A.

The second window is a window B for executing an image display application. The image display application is used to display a landscape image in the window B.

After the window A is moved to and overlapped with the window B, the image display application executed in the window A acquires data of the portrait image in the window A, performs image edition on the data, and transmits the edited data to the window B. The image display application executed in the window B displays a new image according to the edited data, to achieve an effect that the portrait is located in the landscape image. The result of the interaction is that the portrait is added to the original image displayed in the window B.

II. Interaction is triggered when a relationship between applications in windows satisfies a predetermined condition.

Initially, a first application is executed in the first window on the touch-sensitive display unit, and a second application is executed in the second window on the touch-sensitive display unit. If the first window for executing the first application and the second window for executing the second application are in a predetermined relationship, i.e., the relationship between applications in the two windows satisfies a predetermined condition and interaction between the two windows are made possible, an interaction is triggered.

For example, if first attributes of the applications in the two windows are related, the interaction may be triggered. The first attributes being related means that there is a possibility to exchange data between the applications in the two windows. For example, such possibility exists between map and magnifier applications, but not between calculator and QQ chat applications.

Then, the first window for executing the first application controls to change a display of content in the second window for executing the second application, so as to implement the interaction.

First Example:

The first window is a window A for executing a magnifier application. The magnifier application is used to magnify local or overall data.

The second window is a window B for executing a map application. The map application is used to display a map in the window B.

The window A is moved to the window B. When it is judged that the first attributes of the applications in the two windows are related, the magnifier application executed in the window A acquires map data of the window B, including the overall data displayed in the window B or the local data at a position selected by the magnifier in the window B.

The overall or local map data of the window B is magnified, and then transmitted to the window B. The map application executed in the window B displays a new image according to the magnified data, to achieve an effect of magnifying overall or local data displayed in the window B. The result of the interaction is that the original image displayed in the window B is magnified by the magnifier application.

Second scenario: the interaction is implemented according to the above third method embodiment of the present invention. The scenario is a scenario of exchanging data between both windows to implement interaction.

In this scenario, there is only a situation where interaction is triggered when a relationship between applications in windows satisfies a predetermined condition.

Initially, a first application is executed in the first window on the touch-sensitive display unit, and a second application is executed in the second window on the touch-sensitive display unit. When the first window for executing the first application and the second window for executing the second application are in a predetermined relationship, that is, the relationship between the applications in the two windows is a predetermined relationship, and interaction between the two windows are made possible, the interaction is triggered. For example, if second attributes of the applications in the two windows are related or the same, the interaction is triggered. The second attributes being related may mean that the applications in the two windows are both game applications but for different games. The second attributes being the same may mean that the applications in the two windows must be the same game application. The interaction can be triggered whether the second attributes are related or the same.

Next, data is exchanged between the first window for executing the first application and the second window for executing the second application, so as to implement interaction.

First Example:

The first window is a window A for executing a game A; the second window is a window B for executing a game B;

when it is judged that the second attributes of the applications in the two windows are related, data exchange is enabled between the window A and the window B;

first data in the game A executed in the window A is acquired, the acquired first data is processed internally in the window A, and the processed first data is transmitted to the game B executed in the window B;

the game B is executed in the window B according to original data of the window B. The window B receives the processed first data transmitted from the window A, and executes the game B according to new data obtained by combining the processed first data and the original data of the window B. The new data is denoted as the second data.

Next, the second data in the game B executed in the window B is acquired, the acquired second data is processed internally in the window B, and the processed second data is transmitted to the game A executed in the window A;

the game A is executed in the window A according to original data of the window A. The window A receives the processed second data transmitted from the window B, and executes the game A according to new data obtained by combining the processed second data and the original data of the window A. The new data is denoted as the third data.

For example, the game A is Angry Birds, and the game B is Plants vs Zombies. The first data is a bird displayed in the window A, and is processed internally in the window A. Then the processed first data is encapsulated and transmitted to the window B. The original data of the window B presents using bombs to bombard zombies. New data obtained by combining the processed first data and the original data of the window B presents that the bombs are substituted with birds to bombard zombies. Then, the result of bombarding zombies with birds is transmitted to the window A for use. This interaction between windows achieves an effect that the games A and B bombard zombies with angry birds between different windows.

Second Example:

The first window is a window A for executing a game A; the second window is a window B for executing the same game A;

when it is judged that the second attributes of the applications in the two windows are the same, data exchange is enabled between the window A and the window B;

first data in the game A executed in the window A is acquired, the acquired first data is processed internally in the window A, and the processed first data is transmitted to the game A executed in the window B;

the game A is executed in the window B according to original data of the window B. The window B receives the processed first data transmitted from the window A, and then executes the game A according to new data obtained by combining the processed first data and the original data of the window B. The new data is denoted as the second data.

Next, the second data in the game A executed in the window B is acquired, the acquired second data is processed internally in the window B, and the processed second data is transmitted to the game A executed in the window A;

the game A is executed in the window A according to original data of the window A. The window A receives the processed second data transmitted from the window B, and then executes the game A according to new data obtained by combining the processed second data and the original data of the window B. The new data is denoted as then third data.

For example, the game A is Angry Birds. The first data is birds displayed in the window A, and is processed internally in the window A. Then, the processed first data is encapsulated and transmitted to the window B. The original data of the window B is pigs, and the new data obtained by combining the processed first data and the original data of the window B present beating pigs with birds. Then, the result of beating pigs with birds is transmitted to the window A for use. This interaction between windows achieves an effect that the same game A beats pigs with angry birds between different windows.

Fourth Method Embodiment

Figure 2:
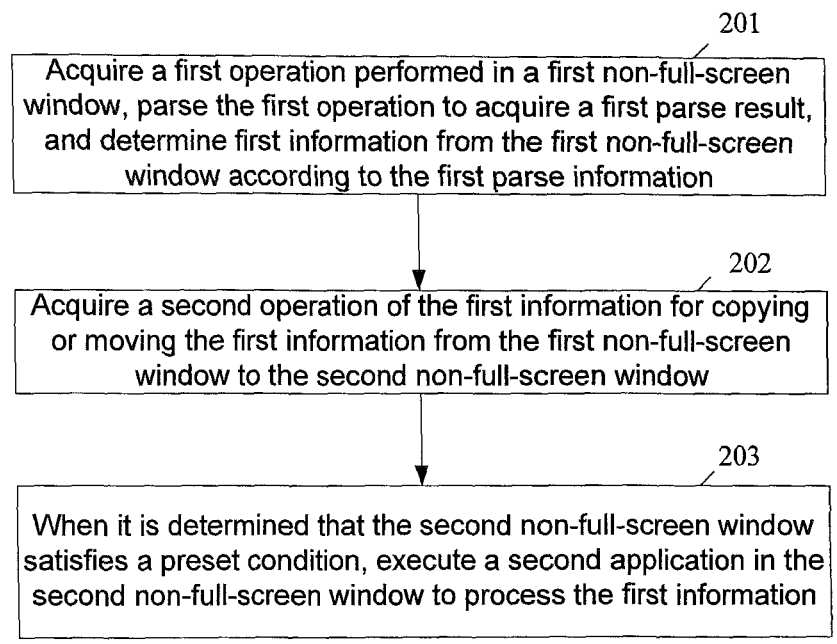
FIG. 2 is a schematic flowchart showing an implementation of another method embodiment of the present invention.

The embodiment of the present invention provides an information processing method in an electronic device, for example, a tablet computer, a smart phone etc. The electronic device includes a touch-sensitive display unit, and is capable of executing multiple applications and displaying these applications in a display area of the touch-sensitive display unit. The electronic device may transform a full-screen window corresponding to an application into a window for executing the application in a non-full-screen by using a transform parameter. As shown in FIG. 2, the method includes:

Step 201: acquiring a first operation performed in a first non-full-screen window, parsing the first operation to acquire a first parse result, and determining first information from the first non-full-screen window according to the first parse information;

Step 202: acquiring a second operation for copying or moving the first information from the first non-full-screen window to a second non-full-screen window;

Step 203, when it is determined that the second non-full-screen window satisfies a preset condition, executing a second application in the second non-full-screen window to process the first information.

Preferably, an application being executed in the first non-full-screen window may be a browser, a word document, or any of applications installed by a user.

The first information may include text information, multimedia information, picture information, mail information, or hyperlink information. The multimedia information may include video information or audio information.

Copying or moving the first information from the first non-full-screen window to the second non-full-screen window may include that after selecting the first information, the user may slide his or her finger from a position of the first information to the second non-full-screen window, i.e., performing the second operation once. When the sliding of the user's finger begins, the electronic device may copy the first information, and stores the selected first information in a clipboard.

The present embodiment will be described below by taking video information as an example of the first information.

Figure 3:
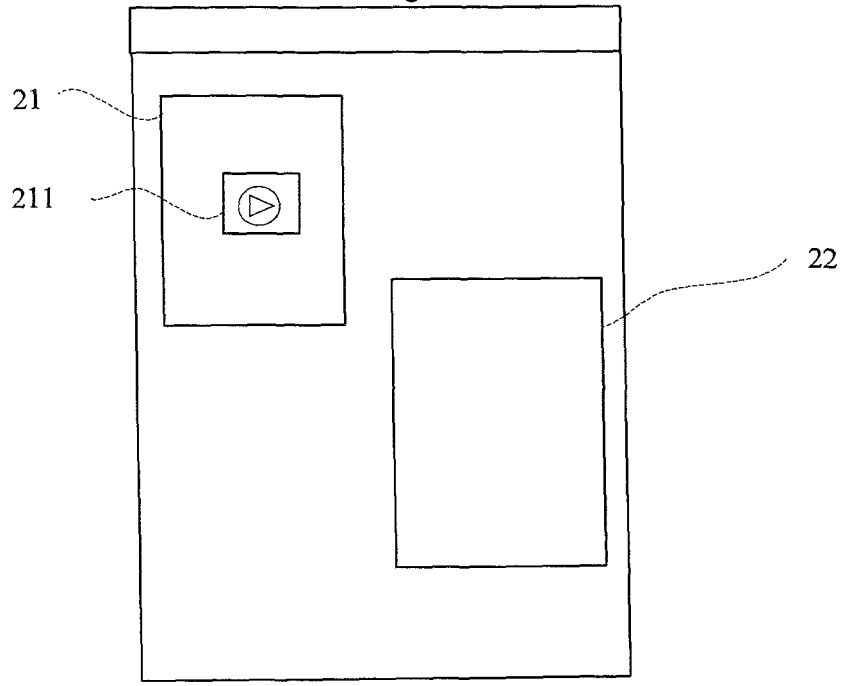
FIG. 3 is a schematic diagram showing an operation of selecting first information according to the embodiment of FIG. 2.

As shown in FIG. 3, a user currently opens a first non-full-screen window 21. The first application executed in the first non-full-screen window 21 is a browser, and the user is viewing his/her Microblog using the browser.

When the user wants to share video information 23 in the Microblog to his/her friend circle of WeChat, the video information 23 may be selected in the first non-full-screen window 21. At this time, the electronic device acquires the user's first operation performed in the first non-full-screen window 21, parses the first operation to acquire a first parse result, and determines first information from the first non-full-screen window to be the video information 23 according to the first parse information.

Figure 4:
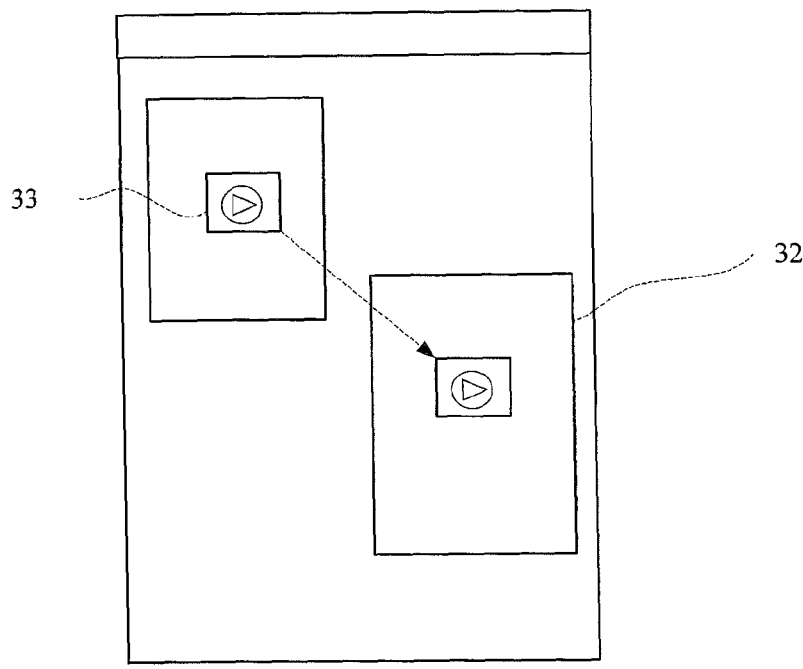
FIG. 4 is a schematic diagram showing an operation of copying or moving to a second non-full-screen window according to the embodiment of FIG. 2.

Next, as shown in FIG. 4, the user drags the selected video information 33 to a second non-full-screen window 32, i.e., performing a second operation. At this time, the application executed in the second non-full-screen window 32 may be WeChat. That is, the electronic device acquires a second operation on the first information for copying or moving the first information from the first non-full-screen window to the second non-full-screen window.

The electronic device judges whether the second non-full-screen window 32 satisfies a preset condition, and acquires a first judgment result. When the first judgment result is that the preset condition is satisfied, the first information is moved to the second non-full-screen window, so that the video information is processed by WeChat executed in the second non-full-screen window 32. When the first judgment result is that the preset condition is not satisfied, the operation is refused, and the user is informed that the operation cannot be implemented.

With the solutions according to the present embodiment, the user is enabled to directly move or copy the selected first information from the first non-full-screen window to the second non-full-screen window. This avoids complicated operations in the conventional technology, and implements data transfer between multiple windowlets, thereby bringing convenience for users and enhancing user experience.

Fifth Method Embodiment

The difference between the fifth embodiment and fourth embodiment of the present invention is that, between steps 202 and 203 of the fourth embodiment, a step is further included of acquiring an information type of the first information, judging whether an application executed in the second non-full-screen window is capable of processing the first information according to the information type, and if so, determining that the second non-full-screen window satisfies the preset condition.

Preferably, judging whether the application executed in the second non-full-screen window is capable of processing the first information may include: detecting an application and/or a plug-in currently executed in the second non-full-screen window is capable of processing information corresponding to the information type.

For example, when the type of the selected first information is mail, and it is detected that a video player is currently running in the second non-full-screen window, it is judged that the application executed in the second non-full-screen window is incapable of processing the first information. When the type of the selected first information is video, and it is detected that a video player is currently running in the second non-full-screen window, it is judged that the application executed in the second non-full-screen window is capable of processing the first information.

Preferably, the second application may be an application for transferring information between two electronic devices. For example, after the first information is moved to a second non-full-screen window for executing the second application, the second application adds the first information into a list, and then the second application transmits the first information to a destination electronic device.

The present embodiment will be described below by taking video information as an example of the first information.

As shown in FIG. 4, after a user drags the selected video information 33 to a second non-full-screen window 32, an information type of the first information 33 is acquired by the electronic device as video. The electronic device judges whether WeChat executed in the second non-full-screen window 32 is capable of processing the video information according to the information type. When a first judgment result is that the preset condition is satisfied, the WeChat executed in the second non-full-screen window 32 is caused to process the video information; and when the first judgment result is that the preset condition is not satisfied, the operation is refused, and the user is informed that the operation cannot be implemented.

With the solutions according to the present embodiment, it is possible to automatically detect whether the second non-full-screen window is capable of processing the first information, and thus facilitate data transfer between multiple windowlets.

Sixth Method Embodiment

The difference between the sixth embodiment and the fifth embodiment of the present invention is that executing the second application in the second non-full-screen window to process the first information specifically includes: when it is determined that the second non-full-screen window satisfies the preset condition, starting, based on the information type of the first information, a second application supporting the information type to automatically load the first information, and display, play or process the first information in the second non-full-screen window.

Preferably, an application or plug-in supporting the information type of the first information is selected as the second application from applications and/or plug-ins executed in the second non-full-screen, according to the information type of the first information. The first information is loaded and displayed, played or processed in the second non-full-screen window by using the second application.

Displaying, playing or processing the first information in the second non-full-screen window may include: when the first information is text information, picture information or mail information, displaying or processing the first information in the second non-full-screen window; and when the first information is multimedia information, playing the first information in the second non-full-screen window.

The present embodiment will be described below by taking video information as an example of the first information.

As shown in FIG. 4, after the electronic device judges that the WeChat executed in the second non-full-screen window 32 is capable of processing video information, a second application supporting the information type of the first information is started according to the information type of the first information, so as to automatically load the first information, and display, play or process the first information in the second non-full-screen window.

Seventh Method Embodiment

The present embodiment provides an information processing method applied in an electronic device such as a smart phone, a tablet computer etc. The electronic device includes a touch-sensitive display unit, and supports executing at least one application so that the application can be displayed in a form of non-full-screen window or full-screen window on the touch-sensitive display unit.

The full-screen window corresponds to an area of the touch-sensitive display unit in which a touch event can be received, and the non-full-screen window is smaller than the area for receiving a touch event, and is obtained by transforming the full-screen window using a transform parameter. The electronic device can control the touch-sensitive display unit to display at least two non-full-screen windows simultaneously.

Figure 5:
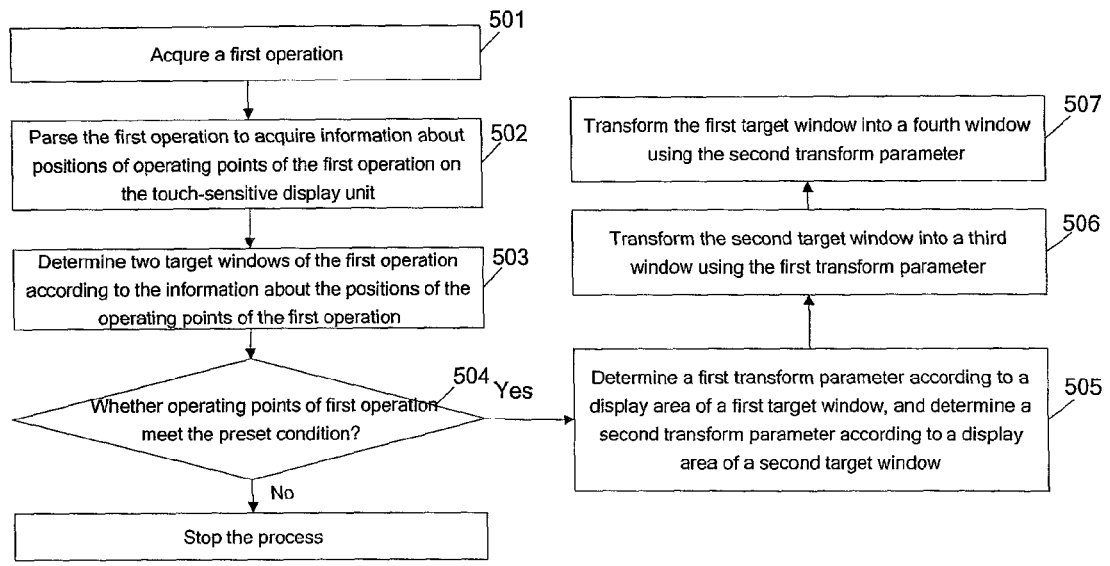
FIG. 5 is a schematic flowchart showing an implementation of another method embodiment of the present invention.

As shown in FIG. 5, the method includes the following steps.

Step 501: acquiring a first operation.

Step 502: parsing the first operation to acquire information about positions of operating points of the first operation on the touch-sensitive display unit.

When a user performs the first operation on the touch-sensitive display unit, the user's finger(s) may directly contact the touch-sensitive display unit, triggering the touch-sensitive display unit to sense at least one operating point corresponding to one or more pixels of the touch-sensitive display unit. When the user performs the first operation, the user's finger(s) may not directly contact the touch-sensitive display unit (in this case, the touch-sensitive display unit may use a mutual capacitance structure), and the touch-sensitive display unit is triggered to sense at least one virtual operating point corresponding to the position of the first operation.

Step 503: determining two target windows of the first operation according to the information about the positions of the operating points of the first operation.

The display areas of the target windows correspond to the positions of the operating points. There is at least one non-full-screen window in the two target windows. That is, there exist two conditions for the two target windows determined in step 503. The first condition is that each of the first and second target windows is a non-full-screen window, and the second condition is that one of the first and second target windows is a non-full-screen window, and the other is a full-screen window.

Step 504: judging whether the operating points of the first operation meet a preset condition, and when the operating points of the first operation meet the preset condition, performing step 505; otherwise, terminating the process.

The present embodiment supports a user to cause contents in the two target windows to be exchanged for display by performing the first operation on the touch-screen display unit. The electronic device judges whether the acquired first operation is an operation of causing contents to be exchanged between the two target windows by judging whether the operating points of the received first operation meet the preset condition. The operating points of the first operation may represent a feature of the first operation, such as a trajectory of the first operation. For example, when the first operation corresponding to the trajectory of closed circular shape is preset in the electronic device as an operation of triggering contents in the two target windows to be exchanged for display, if the operating points of the first operation acquired by the electronic device in step 501 represent that the trajectory of the acquired first operation is a closed circle, the electronic device judges in step 504 that the first operation acquired in step 501 satisfies the preset condition.

Step 505: determining a first transform parameter according to a display area of a first target window from the two target windows, and determining a second transform parameter according to a display area of a second target window from the two target windows.

Step 506: obtaining a third window for substituting the second target window by transforming the second target window using the first transform parameter, so that the content corresponding to the second target window is displayed in the third window. A display area of the third window is the same as that of the first target window.

Step 507: obtaining a fourth window for substituting the first target window by transforming the first target window using the second transform parameter, so that the content corresponding to the first target window is displayed in the fourth window. A display area of the fourth window is the same as that of the second target window.

The process of obtaining a non-full-screen window by transforming the full-screen window using a transform parameter will be described below.

An example will be described in which the transform parameter is in a form of matrix, and the full-screen window is scaled down by ½ using the transform parameter to be transformed into a non-full-screen window. Firstly, image buffer data corresponding to the full-screen window is acquired. The image buffer data includes two-dimensional coordinates $(x_o,y_o)$ identifying pixels, and the two-dimensional coordinates $(x_o,y_o)$ are extended into three-dimensional coordinates $(x_o, y_o, z_o)$. A matrix $$\begin{pmatrix} M_{11} & M_{12} & M_{13} \\ M_{21} & M_{22} & M_{23} \\ M_{31} & M_{32} & M_{33} \end{pmatrix}$$

is used to transform three-dimensional coordinates $(x_o,y_o,z_o)$ of the pixels in the image buffer data which corresponds to the full-screen window. Each of $M_{11}$ and $M_{22}$ corresponds to a scale-down factor and is equal to ½, $M_{33}$ is equal to ½ or may be equal to some other value, and the other elements in the matrix are equal to 0. Three-dimensional coordinates $(x_t, y_t, z_t)$ of pixels in the image buffer data which corresponds to the non-full-screen window is shown in Equation (1).

$$(x_t, y_t, z_t) = \begin{pmatrix} M_{11} & M_{12} & M_{13} \\ M_{21} & M_{22} & M_{23} \\ M_{31} & M_{32} & M_{33} \end{pmatrix} \times \begin{pmatrix} x_o \\ y_o \\ z_o \end{pmatrix} \quad (1)$$

Frame buffer data is obtained by using the transformed image buffer data, and image buffer data of content corresponding to an area of the full-screen window other than the display area of the non-full-screen window. The transformed non-full-screen window is displayed on the touch-sensitive display unit using the acquired frame buffer data, and the other content such as a desktop, a status bar etc. is displayed in an area other than the display area of the non-full-screen window. In consideration of a situation that an overlapped area may exist among multiple non-full-screen windows obtained by transforming multiple full-screen windows, the two-dimensional coordinates $(x_o,y_o)$ identifying the pixels in the image buffer data of the full-screen window are correspondingly extended into three-dimensional coordinates $(x_o, y_o, z_o)$ in the present embodiment, and different non-full-screen windows have different third dimensional coordinates $z_o$. Therefore, non-full-screen windows can be distinguished by different third dimensional coordinates, and it is possible to determine an overlapping relationship between display areas of different non-full-screen windows when they have an overlap area with each other. For example, when there is an overlapped area between a non-full-screen window 1 and a non-full-screen window 2, if the third dimensional coordinate of the non-full-screen window 2 is farther from the origin of coordinates than the that of the non-full-screen window 1, it indicates that a part of the display area of the non-full-screen window 1 is overlapped with the non-full-screen window 2, and the overlap area between the non-full-screen window 1 and the non-full-screen window 2 is used by the non-full-screen window 2 for display.

The present embodiment can achieve the following effects. When a user performs a first operation on a touch-sensitive display unit of an electronic device, the electronic device can be caused to exchange contents in two windows targeted by the first operation. Each of the two target windows may be a non-full-screen window, or one of the two target windows may be a non-full-screen window. This satisfies the user's need for exchanging contents in the windows for display in some scenarios. In addition, the operation is quick and convenient, thus enhancing user experience.

Eighth Method Embodiment

The present embodiment describes the step of determining two target windows of the first operation according to information about the positions of the operating points of the first operation as described in the seventh embodiment The present embodiment can achieve the following effects. When a user performs a first operation on a touch-sensitive display unit of an electronic device, if the operating points of the first operation are located in two windows, for example, the operating points of the first operation are located in a full-screen window and a non-full-screen window 1 as shown in FIG. 6a, or the operating points of the first operation are located in non-full-screen windows 1 and 2 as shown in FIG. 6b, the full-screen window and the non-full-screen window 1 are determined to be the two target windows in FIG. 6a, or the non-full-screen windows 1 and 2 are determined to be the two target windows in FIG. 6b.

Figure 6A:
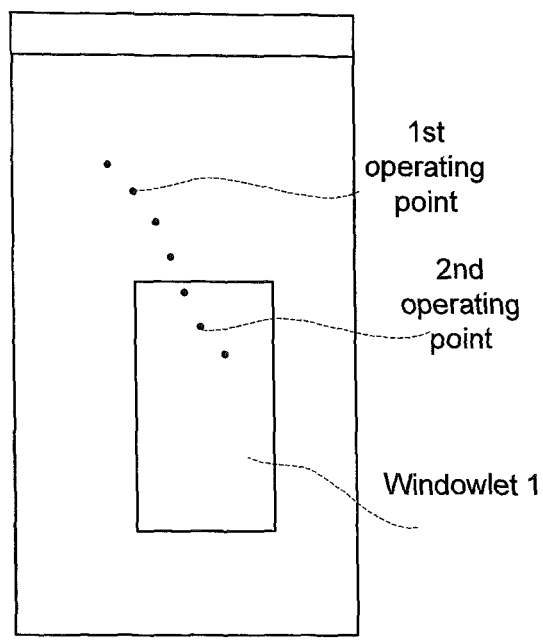
FIG. 6a is a first schematic diagram of operating points of a first operation according to a method embodiment of the present invention.
Figure 6B:
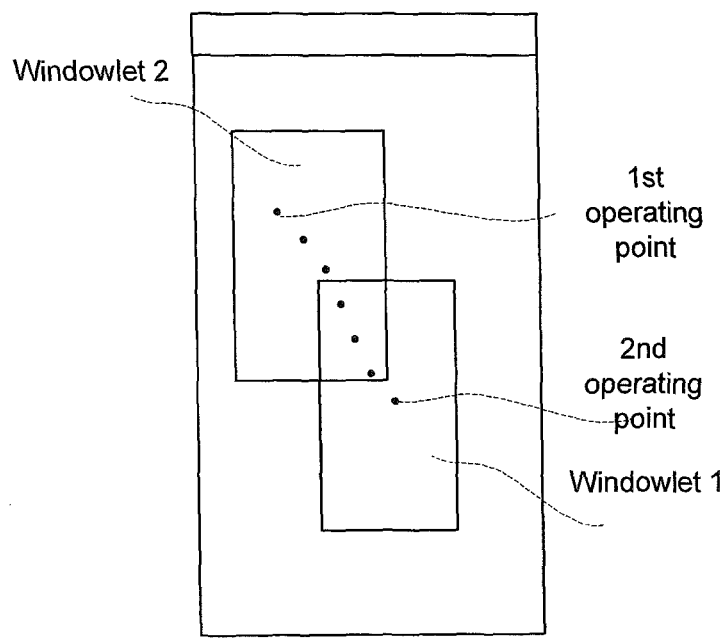
FIG. 6b is a second schematic diagram of operating points of a first operation according to a method embodiment of the present invention.

As shown in FIGS. 6a and 6b, the operating points of the first operation include at least a first operating point and a second operating point. The information about the positions of the operating points of the first operation includes first coordinates and second coordinates. The first coordinates represent information about the position of the first operating point and the second coordinates represent information about the position of the second operating point.

Figure 6C:
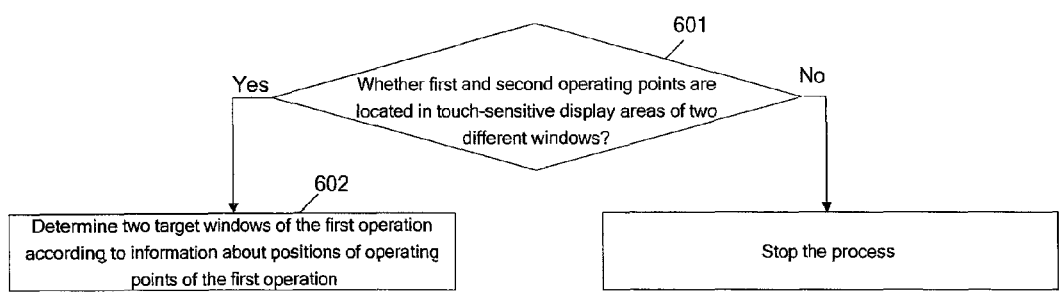
FIG. 6c is a schematic flowchart showing an implementation of determining two target windows according to information about positions of operating points of a first operation according to a method embodiment of the present invention.

As shown in FIG. 6c, determining the two target windows according to the information about the positions of the operating points of the first operation includes the following steps.

Step 601: judging whether the first and second operating points are located in touch-sensitive display areas of two different windows, respectively, according to the first and second coordinates; and if so, performing step 602; otherwise, terminating the process.

Step 602: determining the window where the first operating point is located to be the first target window, and determining the window where the second operating point is located to be the second target window.

In the process of implementing the present invention, the inventors found that a user of the electronic device often habitually selects multiple target objects using a slide operation or a tap operation, since these operations are effective to select a target object in an electronic device including a touch-sensitive display unit. Correspondingly, the present embodiment supports judging the information about positions of operating points of the first operation performed by a user to determine two target windows of the first operation. This complies with users' habits, and the operation is effective and quick, thus enhancing user experience.

Ninth Method Embodiment

The present embodiment describes the step of judging whether the operating points of the first operation meet the preset condition as described in the seventh embodiment. In actual applications, a user may perform various first operations on the touch-sensitive display unit of the electronic device. For example, there may be various trajectories or tapping patterns for the first operation. Therefore, after the first operation is acquired, it is necessary to judge whether the acquired first operation satisfies the preset condition, i.e., judging whether the first operation corresponds to a preset trajectory or tapping pattern, so as to judge whether to further determine the two target windows of the first operation.

Figure 7:
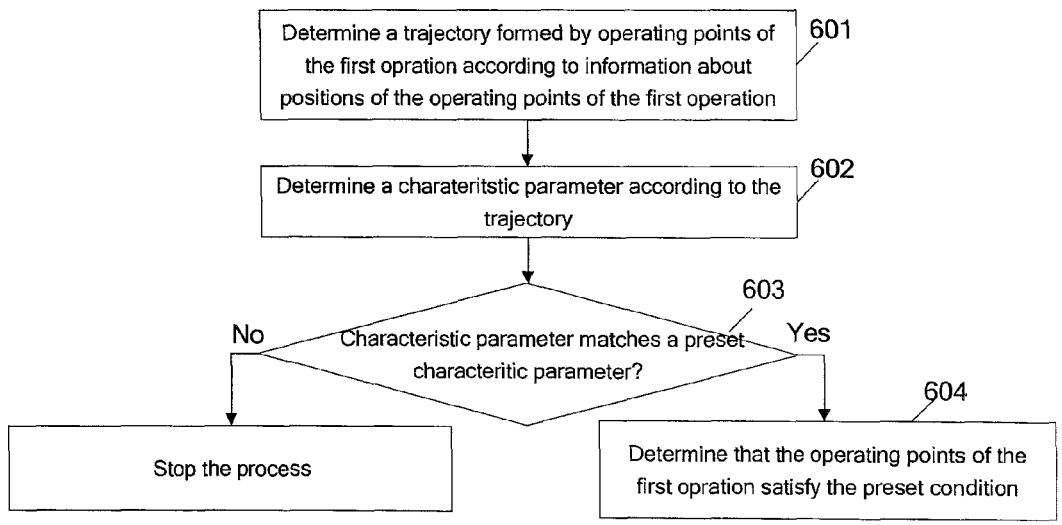
FIG. 7 is a schematic flowchart showing an implementation of judging whether a first operation satisfies a preset condition according to an embodiment of the present invention.

As shown in FIG. 7, judging whether the first operation satisfies the preset condition includes the following steps.

Step 701: determining a trajectory formed by operating points of the first operation according to information about positions of the operating points of the first operation.

Here, the trajectory includes a line formed by a first continuous sliding operation, or one or more operating points formed by a first tapping operation.

Step 702: determining a characteristic parameter according to the trajectory.

The characteristic parameter may represent a shape and position of the trajectory. When the trajectory is one or more operating points, the characteristic parameter may also represent a duration during which the operating points are being sensed.

Step 703: judging whether the characteristic parameter matches a preset characteristic parameter, and if so, performing step 704; otherwise, stopping the process.

Step 704: judging whether the operating points of the first operation meet the preset condition.

The present embodiment achieves the following effects. A user can preset a particular first operation for selecting target windows in an electronic device. For example, when the preset characteristic parameter corresponds to a first operation with a trajectory of "S" shape, if the user performs the first operation with a trajectory of "S" shape on a touch-sensitive display unit of the electronic device to select two windows, the electronic device is caused to determine the two windows selected using the first operation to be two target windows. Therefore, the user can conveniently select two target windows, so that contents in the two target windows can be exchanged for display.

Tenth Method Embodiment

The present embodiment describes the process of acquiring and displaying the first and fourth windows as described in the seventh embodiment.

Figure 8A:
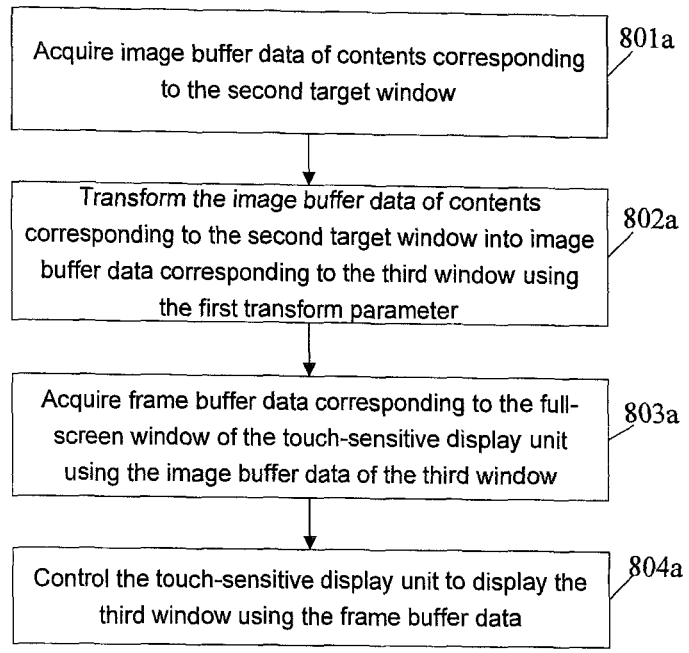
FIG. 8a is a schematic flowchart showing an implementation of transforming a second target window into a third window according to an embodiment of the present invention.

First scenario: each of the first and second target windows is a non-full-screen window As shown in FIG. 8a, obtaining the third window by transforming the second target window using the first transform parameter includes the following steps.

Step 801a: acquiring image buffer data of content corresponding to the second target window.

Step 802a: transforming the image buffer data of content corresponding to the second target window into image buffer data corresponding to the third window using the first transform parameter.

Here, the image buffer data of the content corresponding to the second target window is image buffer data for display in a full screen. That is, the third window is a non-full-screen window obtained by transforming a full-screen window in which the content of the second target window is displayed. Therefore, the same approach as described in the seventh embodiment may be used. That is, the image buffer data corresponding to the third window may be obtained by transforming the corresponding image buffer data when the content corresponding to the second target window are displayed in a full screen using the first transform parameter.

Step 803a: acquiring frame buffer data corresponding to the full-screen window of the touch-sensitive display unit using the image buffer data of the third window.

In step 803a, the image buffer data acquired in step 802a and the image buffer data corresponding to common content (for example, a desktop, a status bar etc.) in the electronic device may further be combined into the frame buffer data, i.e., the frame buffer data corresponding to the content displayed on the full-screen area of the electronic device. Therefore, the third window may be displayed using the frame buffer data, and the content such as a desktop, a status bar etc. may be displayed outside the display area of the third window.

Step 804a: controlling the touch-sensitive display unit to display the third window using the frame buffer data.

Figure 8B:
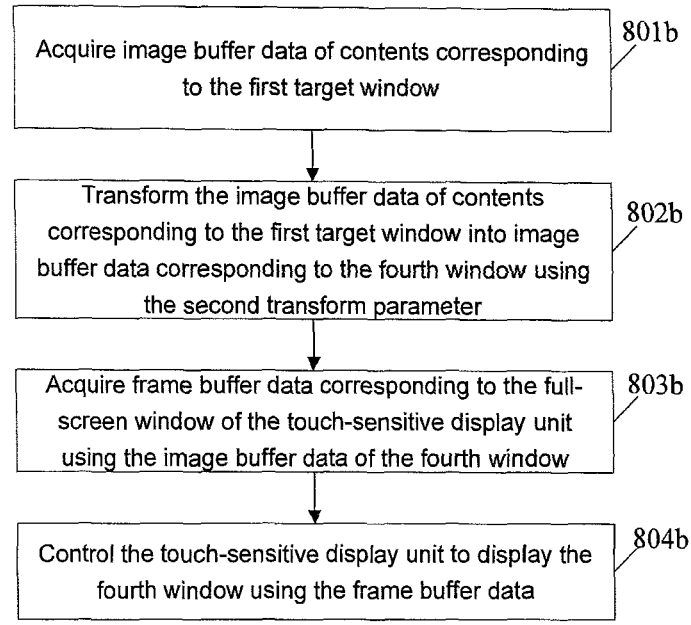
FIG. 8b is a schematic flowchart showing an implementation of transforming a first target window into a fourth window according to an embodiment of the present invention.

As shown in FIG. 8b, obtaining the fourth window by transforming the first target window using the second transform parameter includes the following steps.

Step 801b: acquiring image buffer data of content corresponding to the first target window.

Step 802b: transforming the image buffer data of content corresponding to the first target window into image buffer data corresponding to the fourth window using the second transform parameter.

Here, the image buffer data of the content corresponding to the first target window is image buffer data for display in a full screen. That is, the fourth window is a non-full-screen window obtained by transforming a full-screen window in which the content of the first target window is displayed. Therefore, the same approach as described in the seventh embodiment may be used. That is, the image buffer data corresponding to the fourth window may be obtained by transforming the image buffer data corresponding to a full-screen window in which the content of the first target window is displayed using the second transform parameter.

Step 803b: acquiring frame buffer data corresponding to the full-screen window of the touch-sensitive display unit using the image buffer data of the fourth window.

In step 803b, the image buffer data acquired in step 802b and the image buffer data corresponding to common content (for example, a desktop, a status bar etc.) in the electronic device may further be combined into the frame buffer data, i.e., the frame buffer data corresponding to the content displayed on the full-screen area of the electronic device. Therefore, the fourth window may be displayed using the frame buffer data, and the content such as a desktop, a status bar etc. may be displayed outside the display area of the fourth window.

Step 804b: controlling the touch-sensitive display unit to display the fourth window using the frame buffer data.

The processes of acquiring the third and fourth windows are described respectively for better illustration. In actual applications, the third and fourth windows are displayed on the touch-sensitive display unit simultaneously. Therefore, when the image buffer data corresponding to the third window and the image buffer data corresponding to the fourth window are acquired, it is necessary to combine the image buffer data of the third window, the image buffer data of the fourth windows, and the image buffer data corresponding to common content (for example, a desktop, a status bar etc.) in the electronic device into frame buffer data, i.e., frame buffer data corresponding to the content displayed on the full-screen area of the electronic device. The third and fourth windows may be displayed using the frame buffer data, and the content such as a desktop, a status bar etc. may be displayed outside the display areas of the third and fourth windows.

Second scenario: the first target window is a full-screen window, and the second target window is a non-full-screen window.

Except that the used first transform parameter is equal to 1, the process of obtaining the third window by transforming the second target window using the first transform parameter is the same as the process of steps 801*a*-804*a*. Since the first target window is a full-screen window, when the content of the first target window and the content of the second target window are exchanged for display, it is sufficient to combine the image buffer data corresponding to the full-screen display window of the content of the second target window and the image buffer data corresponding to the common content (for example, a desktop, a status bar etc.) in the electronic device into frame buffer data. Therefore, the third window (i.e., a full-screen window) may be displayed using the frame buffer data, without transforming the image buffer data corresponding to the full-screen display window of the content of the second target window using the first transform parameter. Therefore, the first transform parameter is equal to 1.

The process of obtaining the fourth window by transforming the first target window using the second transform parameter is the same as the process of steps 801*b*-804*b*, and detailed description will be omitted here.

Third scenario: the first target window is a non-full-screen window, and the second target window is a full-screen window The process of obtaining the third window by transforming the second target window using the first transform parameter is the same as the process of steps 801*a*-804*a*.

Except that the used second transform parameter is equal to 1, the process of obtaining the fourth window by transforming the first target window using the second transform parameter is the same as the process of steps 801*b*-804*b*. Since the second target window is a full-screen window, when the content of the first target window and the content of the second target windows are exchanged for display, it is sufficient to combine the image buffer data corresponding to the full-screen display window of the content of the first target window and the image buffer data corresponding to the common content (for example, a desktop, a status bar etc.) in the electronic device into frame buffer data. Thereby, the fourth window (i.e., a full-screen window) may be displayed using the frame buffer data, without transforming the image buffer data corresponding to the full-screen display window of the content of the first target window using the second transform parameter. Therefore, the second transform parameter is equal to 1.

In the present embodiment, it is possible to exchange the content of the two target windows for display by transforming a target window using a transform parameter corresponding to the target window.

Eleventh Method Embodiment

Figure 9:
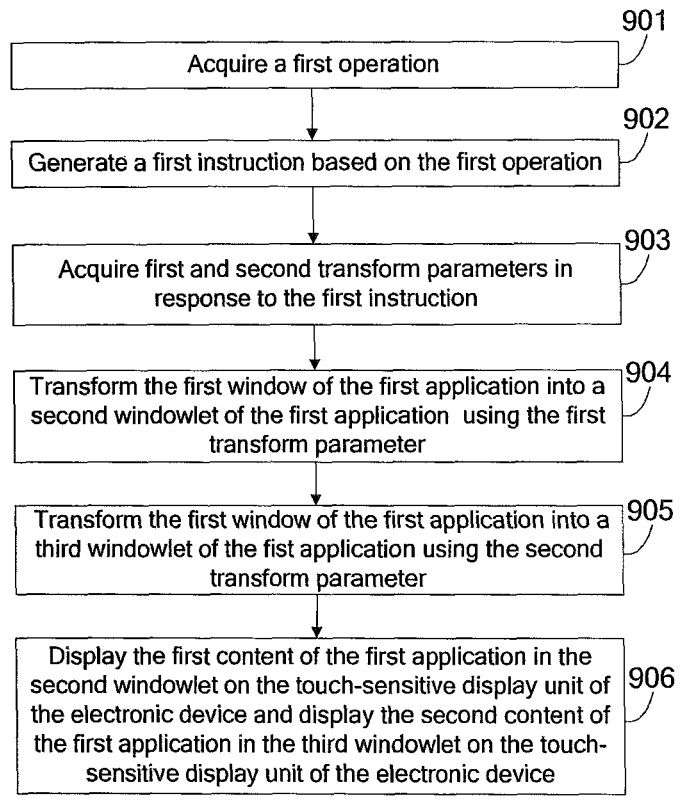
FIG. 9 is a schematic flowchart showing an implementation of another method embodiment of the present invention.

FIG. 9 is a schematic flowchart showing an information processing method according to an eleventh embodiment of the present invention. The information processing method according to the present embodiment is applied in an electronic device. The electronic device includes a touch-sensitive display unit and is capable of executing an application which is displayed in a first window on the touch-sensitive display unit. The first window is a full-screen window or a first non-full-screen window. The first non-full-screen window is smaller than the full-screen window. As shown in FIG. 9, the information processing method includes the following steps.

Step 901: acquiring a first operation.

In the present embodiment, the application installed in the electronic device may be an application built in the electronic device system, for example, a clock application, a camera application etc., or may be a third-party application installed by a user, for example, a WeChat application, a game application etc.

Generally, all applications are displayed in a form of an icon list on the desktop of the electronic device, and each application corresponds to one icon. An application may be started by touching the corresponding icon. When the application is started in this way, the application will be displayed in a full-screen window on the touch-sensitive display unit of the electronic device. When the application is started in a mode of non-full-screen window, the application will be displayed in a first non-full-screen window on the touch-sensitive display unit of the electronic device. Each of the above full-screen window and the first non-full-screen window may be referred to as first window in the present embodiment. All content of the application are displayed in the first window.

By splitting a current first window into two non-full-screen windows, a user may trigger a first operation to focus on the desired content. As such, the electronic device acquires the first operation, and perform step 102.

Here, the first operation may include a touch operation, a key-press operation, a gesture operation and a voice operation.

For example, the touch operation may be a single-click touch operation, a double-click touch operation etc. In a specific implementation, a user may trigger the first operation by single-clicking on a position in the first window, or by double-clicking on a position in the first window within a predetermined time period.

Step 902: generating a first instruction based on the first operation.

Here, a first instruction for splitting the first window into second and third non-full-screen windows may be generated according to the first operation.

Step 903: acquiring first and second transform parameters in response to the first instruction.

Here, each of the first and second transform parameters is at least one of a parameter, a matrix, a group of parameters, or a set of parameters.

For example, the first transform parameter may be represented by a first matrix. Here, after acquiring the first operation and generating the first instruction, the electronic device may respond to the first instruction. Specifically, the first matrix is firstly acquired. The first matrix may be pre-stored in a matrix function library of the electronic device, and may be used to transform the first window into a second non-full-screen window. For example, the first matrix may be used to perform a scale-down transform on the first widow, and then perform a translation transform and a shape transform etc. on the scaled-down first window. Preferably, the first matrix may be preset by a manufacturer of the electronic device, or may be set by a user manually in the electronic device. In order to facilitate the user in setting the first matrix manually, the electronic device provides a function of automatically generating a matrix. The user may simply set certain parameters related to the first matrix, for example, a window horizontal coordinate scaling parameter, a window longitudinal coordinate scaling parameter, a window translation parameter and a window shape parameter. Then the electronic device may generate a corresponding first matrix based on these parameters.

Those skilled in the art should understand that the second transform parameter may be represented by the second matrix in a manner similar to the above first transform parameter. It should be noted that the second transform parameter is different from the first transform parameter.

Step 904: generating a second non-full-screen window for the application by transforming the first window of the application using the first transform parameter.

The second non-full-screen window for the application is smaller than the full-screen window of the application.

When the first transform parameter is represented by the first matrix, the first window of the application may be transformed using the first matrix by the following Equation (1a):

$$\begin{pmatrix} x_2 \\ y_2 \\ z_2 \end{pmatrix} = \begin{pmatrix} M_{11} & M_{12} & M_{13} \\ M_{21} & M_{22} & M_{23} \\ M_{31} & M_{32} & M_{33} \end{pmatrix} \times \begin{pmatrix} x_1 \\ y_1 \\ z_1 \end{pmatrix} \quad (1a)$$

Wherein, $$\begin{pmatrix} x_2 \\ y_2 \\ z_2 \end{pmatrix}$$

represents a coordinate vector of a non-full-screen window, where $x_2$ is a horizontal coordinate of the non-full-screen window, $y_2$ is a longitudinal coordinate of the non-full-screen window, $z_2$ is generally set to 1 by default;

$$M = \begin{pmatrix} M_{11} & M_{12} & M_{13} \\ M_{21} & M_{22} & M_{23} \\ M_{31} & M_{32} & M_{33} \end{pmatrix},$$

where M represents the first matrix of a 3×3 size, $M_{ij}$ represents an element at the $i^{th}$ row and the $j^{th}$ column of the first matrix, a value of i is 1, 2 or 3, and a value of j is 1, 2 or 3;

$$\begin{pmatrix} x_1 \\ y_1 \\ z_1 \end{pmatrix}$$

represents a coordinate vector of the first window, where $x_1$ is a horizontal coordinate of the first window, $y_1$ is a longitudinal coordinate of the first window, and $z_1$ is generally set to 1 by default.

When the scaling transform is performed on first window using Equation (1a), 4 elements in $M_{ij}$ may be set as $M_{11}=\alpha$, $M_{12}=0$, $M_{2,1}=0$, $M_{22}=\beta$, and the other 5 elements may be set randomly. Then, Equation (2a) may be derived by substituting the parameters set above into Equation (1a):

$$x_2 = \alpha \times x_1$$

$$y_2 = \beta \times y_1 \quad (2a)$$

wherein, $\alpha$ is a horizontal coordinate scaling parameter, and $\beta$ is a longitudinal coordinate scaling parameter.

When the rotation transform is performed on the first window using Equation (1a), 4 elements in $M_{ij}$ may be set as $M_{11}=\cos\theta$, $M_{12}=\sin\theta$, $M_{21}=-\sin\theta$, $M_{22}=\cos\theta$, and the other 5 elements may be set randomly. Then, Equation (3a) may be derived by substituting the parameters set above into Equation (1a):

$$x_2 = \cos\theta \times x_1 + \sin\theta \times y_1$$

$$y_2 = -\sin\theta \times x_1 + \cos\theta \times y_1 \quad (3a)$$

wherein, $\theta$ is a rotation angle.

The translation transform may be performed on the first window of the application using the first matrix through Equation (4a):

$$\begin{pmatrix} x_2 \\ y_2 \\ z_2 \end{pmatrix} = \begin{pmatrix} M_{11} \\ M_{21} \\ M_{31} \end{pmatrix} + \begin{pmatrix} x_1 \\ y_1 \\ z_1 \end{pmatrix} \quad (4a)$$

When the translation transform is performed on first window using Equation (4a), 3 elements in may be set as $M_{ij}$ a $M_{11}=a$, $M_{21}=b$, $M_{31}=0$. Therefore, Equation (5a) may be derived by substituting the parameters set above into Equation (4a):

$$x_2 = a + x_1$$

$$y_2 = b + y_1 \quad (5a)$$

wherein, a is a horizontal coordinate translation parameter, and b is a longitudinal coordinate translation parameter.

Step 905: generating a third non-full-screen window for the application by transforming the first window of the application using the second transform parameter.

The third non-full-screen window for the application is smaller than the first window of the application.

When the second transform parameter is represented by the second matrix, the principle of transforming the first window of the application using the second matrix is the same as that of step 904. The difference from step 904 is that the second matrix is different from the first matrix, and detailed description will be omitted here. Since the second transform parameter is different from the first transform parameter, the display area of the third non-full-screen window acquired using the second transform parameter is different from that of the second non-full-screen window acquired using the first transform parameter.

Step 906: displaying the first content of the application in the second non-full-screen window on the touch-sensitive display unit of the electronic device, and displaying the second content of the application in the third non-full-screen window on the touch-sensitive display unit of the electronic device.

In the above solution, when the first operation is a touch operation, the method further includes:

acquiring a trajectory of the touch operation on the touch-sensitive display unit;

parsing the trajectory to acquire an area scope in the first window;

splitting the content in the first window into first content and second content based on the area scope; and displaying the first content using the second non-full-screen window, and displaying the second content using the third non-full-screen window.

Specifically, the first content of a user's interest may be determined according to the trajectory of the user's operation. The first content and the rest content of the application, i.e., the second content, are then displayed respectively in the second non-full-screen window and the third non-full-screen window.

In the present embodiment, the content of the application include first content and second content. After the electronic device acquires the first operation of the user, it splits the first window displaying all the content of the application into a second non-full-screen window and a third non-full-screen window, and displays the first content in the second nonfull-screen window and displays the second content in the third non-full-screen window. This enables the content of the user's interest to be displayed in a separate window, thus enhancing user experience.

Twelfth Method Embodiment

The difference between the present embodiment of the invention and the eleventh method embodiment is that displaying the first content of the application in the second non-full-screen window on the touch-sensitive display unit of the electronic device, and displaying the second content of the application in the third non-full-screen window on the touch-sensitive display unit of the electronic device in step 906 specifically includes: reading the graphical buffer data of the application, and splitting the graphical buffer data into first graphical buffer sub-data and second graphical buffer sub-data based on the first transform parameter and the second transform parameter; combining the first graphical buffer sub-data into first frame buffer sub-data, and displaying the first frame buffer sub-data in the second non-full-screen window of the application on the touch-sensitive display unit of the electronic device; and combining the second graphical buffer sub-data into second frame buffer sub-data, and displaying the second frame buffer sub-data in the third non-full-screen window of the application on the touch-sensitive display unit of the electronic device.

The first graphical buffer sub-data is used to display the first content, and the second graphical buffer sub-data is used to display the second content.

Here, the first transform parameter represents a scope of content to be displayed in the second non-full-screen window, and the second transform parameter represents a scope of content to be displayed in the third non-full-screen window. The first graphical buffer sub-data corresponding to the first content and the second graphical buffer sub-data corresponding to the second content may be determined based on the first transform parameter and the second transform parameter.

Here, the graphical buffer data of the application may be Red, Green and Blue (RGB) data.

The electronic device according to the present embodiment includes two buffer areas, which are a graphical buffer and a frame buffer respectively. The graphical buffer is used to store RGB data for application drawing; and the frame buffer is used to store frame buffer data after the graphical buffer data is combined. The content displayed in the display area of the screen of the electronic device is complete frame data. The data in the graphical buffer is divided into first graphical buffer sub-data and second graphical buffer sub-data.

Thirteenth Method Embodiment

The difference between the embodiment of the present invention and the twelfth embodiment is that a step is further included of acquiring a third operation.

Here, the third operation may have a touch-sensitive area equal to the display area of the second non-full-screen window. In actual applications, a user may control the application by touching the display area of the second non-full-screen window. The electronic device may acquire the third operation as the user touches.

A second position parameter of the third operation may generated by performing an inverse transform on the first position parameter of the third operation using the first transform parameter of the second non-full-screen window. Here, the first position parameter may be the coordinates of the third operation on the second non-full-screen window. When the application responds to the third operation, it is necessary to acquire the original position parameter, referred to as the second position parameter, by inversely transforming the first position parameter using the first transform parameter.

Specifically, when the first transform parameter is represented by the first matrix, the inverse transform is performed on the first position parameter of the third operation using the first matrix by the following Equation (6c):

$$\begin{pmatrix} x_2 \\ y_2 \\ z_2 \end{pmatrix} = \begin{pmatrix} M_{11} & M_{12} & M_{13} \\ M_{21} & M_{22} & M_{23} \\ M_{31} & M_{32} & M_{33} \end{pmatrix}^{-1} \times \begin{pmatrix} x_1 \\ y_1 \\ z_1 \end{pmatrix} \quad (6c)$$

where $$\begin{pmatrix} x_2 \\ y_2 \\ z_2 \end{pmatrix}$$

represents a coordinate vector of a second position parameter, $x_2$ is a horizontal coordinate of the second position parameter, $y_2$ is a longitudinal coordinate of the second position parameter, $z_2$ is generally set to 1 by default;

$$M = \begin{pmatrix} M_{11} & M_{12} & M_{13} \\ M_{21} & M_{22} & M_{23} \\ M_{31} & M_{32} & M_{33} \end{pmatrix},$$

where M represents the first matrix of a 3×3 size, $M_{ij}$ represents an element at the $i^{th}$ row and the $j^{th}$ column of the first matrix, a value of i is 1, 2 or 3, and a value of j is 1, 2 or 3;

$$\begin{pmatrix} x_1 \\ y_1 \\ z_1 \end{pmatrix}$$

represents a coordinate vector of the first position parameter, where $x_1$ is a horizontal coordinate of the first position parameter, $y_1$ is a longitudinal coordinate of the first position parameter, and $z_1$ is generally set to 1 by default.

A third instruction is generated based on the second position parameter. Specifically, the application may generate a third instruction according to the second position parameter. For example, when the second position parameter represents a position at a "restart" button of the display area of the second non-full-screen window for the application, the third instruction is for restarting the application.

The graphical buffer data of the application is updated in response to the third instruction. Specifically, after the third instruction is executed, the application will update the graphical buffer data to refresh a display interface for controlling the display unit.

The first and second graphical buffer sub-data are updated based on the updated graphical buffer data.

The updated first graphical buffer sub-data are combined into third frame buffer sub-data, and the third frame buffer sub-data are displayed in the second non-full-screen window of the application on the touch-sensitive display unit of the electronic device.

The updated second graphical buffer sub-data are combined into fourth frame buffer sub-data, and the fourth frame buffer sub-data are displayed in the third non-full-screen window of the application on the touch-sensitive display unit of the electronic device.

In the present embodiment of the present invention, when the user controls the application in the second non-full-screen window, the display interfaces of second and third non-full-screen windows will be updated in real time.

Fourteenth Method Embodiment

The difference between the present embodiment of the present invention and the twelfth embodiment is that a step is further included of acquiring a second operation.

Specifically, when a user wants to close or hide the second or third non-full-screen window of no interest and display only the third or second non-full-screen window of interest on the touch-sensitive display unit, the user may trigger the second operation, and the electronic device may acquire the second operation.

A second instruction for closing or hiding the second or third non-full-screen window is generated based on the second operation.

The first content of the second non-full-screen window or the second content of the third non-full-screen window is closed or hidden in response to the second instruction.

Fifth Method Embodiment

The difference between the present embodiment of the present invention and the twelfth embodiment is that a step is further included of judging whether the first content of the second non-full-screen window or the second content of the third non-full-screen window satisfies a preset condition.

Here, the preset condition may indicate content of no interest by a user, such as an advertisement or a pushed picture etc. When the first content or the second content is a content of no interest by a user, such as an advertisement or a pushed picture etc., the content is closed or hidden automatically.

When the judgment result indicates that the first content of the second non-full-screen window or the second content of the third non-full-screen window satisfies the preset condition, the first content of the second non-full-screen window or the second content of the third non-full-screen window is closed or hidden.

Description of electronic devices below is similar to that of the above methods. The beneficial effects are the same as those of the methods, and thus description thereof will be omitted. Details of the electronic device embodiments of the present invention can be learned with reference to the description of the method embodiments of the present invention. In addition, various functional units below may be implemented by display units and processors of the electronic devices.

First Electronic Device Embodiment

Figure 10:
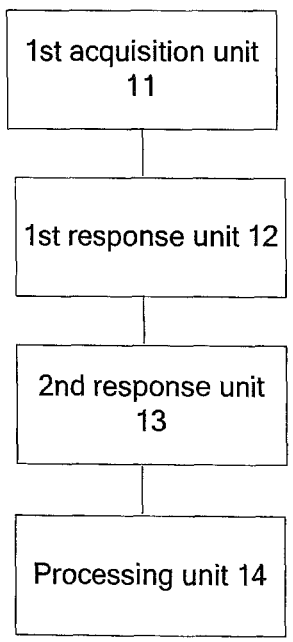
FIG. 10 is a schematic diagram of a structure of an electronic device embodiment of the present invention.

An electronic device according to an embodiment of the present invention includes a touch-sensitive display unit including a display area, and is capable of executing multiple applications and displaying the multiple applications in multiple windows simultaneously. The multiple windows include a windowlet and/or a full-screen window. The windowlet is smaller than the full-screen window and is obtained by transforming the full-screen window using a transform parameter. As shown in FIG. 10, the electronic device further includes:

a first acquisition unit 11 configured to acquire a first operation; a first response unit 12 configured to generate a first instruction according to the first operation, display a first window on the display area according to the first instruction, and start and execute a first application in the first window, in response to the first operation; a second acquisition unit configured to acquire a second operation; a second response unit 13 configured to generate a second instruction according to the second operation, display a second window on the display area according to the second instruction, and start and execute a second application in the second window, in response to the second operation; and a processing unit 14 configured to enable interaction between the first window for executing the first application and the second window for executing the second application upon detecting that the first window for executing the first application and the second window for executing the second application are in a predetermined relationship.

In a preferred embodiment, the processing unit 14 is configured to cause the first window to control to change a display of content in the second window, so as to implement the interaction upon detecting that the first window for executing the first application and the second window for executing the second application are in a predetermined relationship.

In a preferred embodiment, the electronic device further includes a trigger unit configured to trigger the interaction upon detecting that the first window for executing the first application and the second window for executing the second application are in the predetermined relationship and/or the first application executed in the first window and the second application executed in the second window are in the predetermined relationship.

In a preferred embodiment, the trigger unit is further configured to trigger the interaction when there is an overlap area between the first window and the second window on the touch-sensitive display unit and thus the predetermined relationship is satisfied.

In a preferred embodiment, the processing unit 14 further comprises a first processing sub-unit configured to acquire data of the first application executed in the first window, and process the acquired data of the first application according to a preset condition; a control sub-unit, configured to transmit the processed data to the second application executed in the second window to control the display of the second application executed in the second window; and a display sub-unit, configured to display, by the second application executed in the second window, new content according the processed data.

Specifically, the processing unit 14 may be further configured to cause data exchange between the first window and the second window so as to implement the interaction upon detecting that the first window for executing the first application and the second window for executing the second application are in the predetermined relationship.

In a preferred embodiment, there are three implementations for the processing unit 14 as follows First implementation: the processing unit 14 further includes a second processing sub-unit configured to acquire data of the first application executed in the first window, and process the acquired data of the first application; a first transmission sub-unit configured to transmit the processed data to the second application executed in the second window; and a first execution sub-unit configured to execute the second application in the second window according to the processed data;

Second implementation: the processing unit 14 further includes a third processing sub-unit configured to acquire data of the second application executed in the second window and process the acquired data of the second application; a second transmission sub-unit configured to transmit the processed data to the first application executed in the first window; and a second execution sub-unit configured to execute the first application in the first window according to the processed data.

To be noted, the above first and second implementations describe scenarios of one-way interaction, and the third implementation described below is a scenario of two-way interaction.

Third implementation: this implementation can be achieved by using the electronic devices in the above first and second implementations as a transmitting side and a receiving side, and thus detailed description thereof will omitted.

Second Electronic Device Embodiment

The embodiment of the present invention provides an electronic device, such as a tablet computer, a smart phone etc. The electronic device includes a touch-sensitive display unit and a processing unit.

The touch-sensitive display unit is configured to display windows corresponding to multiple applications in a display area, acquire a first operation performed in a first non-full-screen window, and acquire a second operation on the first information for copying or moving first information from the first non-full-screen window to the second non-full-screen window;

the processing unit is configured to execute the multiple applications, and transform a full-screen display window corresponding to the application using a transform parameter to acquire a window for executing the application in a form of non-full-screen; parse the first operation acquired in the touch-sensitive display unit to obtain a first parse result, and determine the first information from the first non-full-screen window according to the first parse information; and upon determining that the second non-full-screen window satisfies a preset condition, execute the second application in the second non-full-screen window to process the first information.

The processing unit is specifically configured to acquire an information type of the first information, judge whether an application executed in the second non-full-screen window is capable of processing of the first information based on the information type, and if so, determine that the second non-full-screen window satisfies the preset condition.

The processing unit is specifically configured to start, based on the information type of the first information, a second application supporting the information type, to automatically load the first information, and display, play or process the first information in the second non-full-screen window.

The processing unit is specifically configured to, when a user selects the first information and slides his or her finger from a position of the first information to the second non-full-screen window, i.e., performing the second operation once, copy the first information, and store the selected first information in a clipboard as the sliding of the user's finger begins.

Preferably, the processing unit is specifically configured to detect whether an application and/or a plug-in currently executed in the second non-full-screen window is capable of processing information corresponding to the information type. For example, when the type of the selected first information is mail, and it is detected that a video player is currently running in the second non-full-screen window, it is judged that the application executed in the second non-full-screen window is incapable of processing of the first information; and when the type of the selected first information is video, and it is detected that a video player is currently running in the second non-full-screen window, it is judged that the application executed in the second non-full-screen window is capable of processing the first information.

Preferably, the processing unit is specifically configured to select an application or plug-in supporting the information type of the first information as the second application from the applications and/or plug-ins executed in the second non-full-screen window based on the information type of the first information; and load the first information and display, play or process the first information in the second non-full-screen window by using the second application.

Third Electronic Device Embodiment

Figure 11:
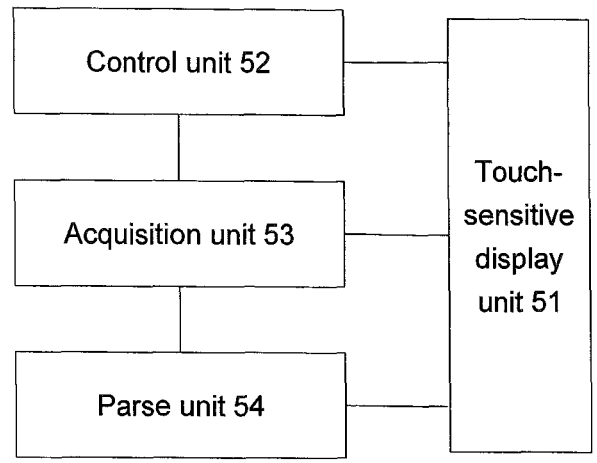
FIG. 11 is a schematic diagram of a structure of another electronic device embodiment of the present invention.

The present embodiment discloses an electronic device as shown in FIG. 11, including a touch-sensitive display unit 51 and a control unit 52.

The control unit 52 is configured to support executing at least one application, so that the application can be displayed in a non-full-screen window or full-screen window on the touch-sensitive display unit. The display area of the full-screen window is an area of the touch-sensitive display unit 51 in which a touch event can be received, and the display area of the non-full-screen window is smaller than the area of the touch-sensitive display unit 51 in which a touch event can be received.

The control unit 52 is further configured to transform the full-screen window using a transform parameter into the non-full-screen window, and control the touch-sensitive display unit 51 to display at least two non-full-screen windows simultaneously. The electronic device further includes:

an acquisition unit 53 configured to acquire a first operation; and a parse unit 54 configured to parse the first operation to acquire information about positions of operating points of the first operation on the touch-sensitive display unit.

The control unit 52 is further configured to determine two target windows of the first operation according to the information about the positions of the operating points of the first operation. The display areas of the target windows correspond to the positions of the operating points. There is at least one non-full-screen window in the two target windows.

The control unit 52 is further configured to judge whether the operating points of the first operation meet a preset condition, and when the operating points of the first operation satify the preset condition, determine a first transform parameter according to a display area of a first target window among the two target windows, and determine a second transform parameter according to a display area of a second target window among the two target windows.

The control unit 52 is further configured to transform the second target window using the first transform parameter to obtain a third window for substituting the second target window, so that the content corresponding to the second target window are displayed in the third window.

The control unit 52 is further configured to transform the first target window using the second transform parameter to obtain a fourth window for substituting the first target window, so that the content corresponding to the first target window are displayed in the fourth window.

The display area of the third window is the same as that of the first target window, and the display area of the fourth window is the same as that of the second target window.

In actual applications, the touch-sensitive display unit 51 may be implemented by a touch-sensitive display screen and associated driving circuits of the electronic device. The control unit 52, the acquisition unit 53 and the parse unit 54 may be implemented by a CPU, a Digital Signal Processor (DSP) or a Field Programmable Gate Array (FPGA) in the electronic device.

In a preferred embodiment, the operating points of the first operation include a first operating point and a second operating point. The information about positions of the operating points of the first operation include first cooridnates and second cooirdnates. The first coordinates represent information about a position of the first operating point, and the second cooridnates represent information about a position of the second operating point.

The control unit 52 is further configured to judge whether the first and second operating points are located in touch-sensitive display areas of two different windows, respectively, according to the first and second coordinates; and when it is judged that the first and second operating points are located in the touch-sensitive display areas of two different windows respectively, determine a window where the first operating point is located to be the first target window, and determine a window where the second operating point is located to be the second target window.

The control unit 52 is further configured to determine a trajectory formed by operating points of the first operation according to information about positions of the operating points of the first operation; determine a characteristic parameter according to the trajectory; judge whether the characteristic parameter matches a preset characteristic parameter; if the characteristic parameter matches the preset characteristic parameter, judge that the operating points of the first operation meet the preset condition.

The control unit 52 is further configured to acquire image buffer data of content corresponding to the second target window; transform the image buffer data of content corresponding to the second target window into image buffer data corresponding to the third window using the first transform parameter; acquire frame buffer data corresponding to the full-screen window of the touch-sensitive display unit 51 using the image buffer data of the third window; control the touch-sensitive display unit 51 to display the third window using the frame buffer data.

The control unit 52 is further configured to acquire image buffer data of content corresponding to the first target window; transform the image buffer data of content corresponding to the first target window into image buffer data corresponding to the fourth window using the second transform parameter; acquire frame buffer data corresponding to the full-screen window of the touch-sensitive display unit 51 using the image buffer data of the fourth window; control the touch-sensitive display unit 51 to display the fourth window using the frame buffer data.

The first transform parameter and the second transform parameter may be in a form of a parameter value, a matrix, a group of parameters, or a set of parameters.

Fourth Electronic Device Embodiment

Figure 12:
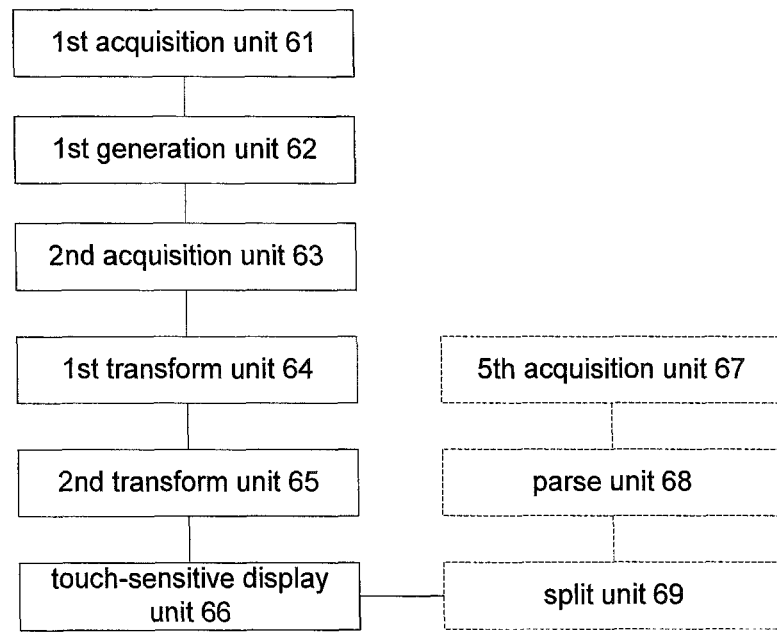
FIG. 12 is a schematic diagram of a structure of another electronic device embodiment of the present invention.

FIG. 12 is a schematic diagram of a constitution of an electronic device according to an embodiment of the present invention. The electronic device includes a touch-sensitive display unit 66, and is capable of executing an application, which is displayed in a first window on the touch-sensitive display unit 66. The first window is a full-screen window or a first non-full-screen window. A display area of the first non-full-screen window is smaller than that of the full-screen window. As shown in FIG. 6, the electronic device includes a first acquisition unit 61, a first generation unit 62, a second acquisition unit 63, a first transform unit 64, and a second transform unit 65.

The first acquisition unit 61 is configured to acquire a first operation.

The first generation unit 62 is configured to generate a first instruction for splitting the first window into second and third non-full-screen windows based on the first operation.

The second acquisition unit 63 is configured to acquire first and second transform parameters in response to the first instruction.

The first transform unit 64 is configured to transform the first window of the application into a second non-full-screen window of the application using the first transform parameter. The display area of the second non-full-screen window of the application is smaller than that of the full-screen window of the application;

The second transform unit 65 is configured to transform the first window of the application into a third non-full-screen window of the application using the second transform parameter. The display area of the third non-full-screen window of the application is smaller than that of the full-screen window of the application.

The touch-sensitive display unit 66 is configured to display the first content of the application in the second non-full-screen window and display the second content of the application in the third non-full-screen window.

In the above, the first transform parameter and the second transform parameter are at least one of a parameter, a matrix, a group of parameters, or a set of parameters.

In the above, the first operation includes a touch operation, a key pressing operation, a gesture operation or a voice operation.

In the above, the electronic device further includes a fifth acquisition unit 67, a parse unit 68, and a split unit 69.

The fifth acquisition unit 67 is configured to acquire a trajectory of a touch operation on the touch-sensitive display unit 66.

The parse unit 68 is configured to parse the trajectory to obtain an area scope in the first window.

The split unit 69 is configured to split the content in the first window into first content and second content based on the area scope.

The touch-sensitive display unit 66 is further configured to display the first content in the second non-full-screen window and display the second content in the third non-full-screen window.

Those skilled in the art should understand that the functions implemented by various units in the electronic device illustrated in FIG. 12 will be learned with reference to the above description of the information processing methods.

Preferably, the touch-sensitive display unit 76 includes:

a read sub-unit configured to read the graphical buffer data of the application;

a split sub-unit configured to split the graphical buffer data into first graphical buffer sub-data and second graphical buffer sub-data based on the first transform parameter and the second transform parameter. The first graphical buffer sub-data are used to display the first content, and the second graphical buffer sub-data are used to display the second content;

a first display sub-unit configured to combine the first graphical buffer sub-data into first frame buffer sub-data, and display the first frame buffer sub-data in the second non-full-screen window of the application;

a second display sub-unit configured to combine the second graphical buffer sub-data into second frame buffer sub-data, and display the second frame buffer sub-data in the third non-full-screen window of the application.

Preferably, the electronic device further includes:

a third acquisition unit configured to acquire a third operation. The third operation may have a touch-sensitive area equal to the display area of the second non-full-screen window;

a third transform unit configured to perform an inverse transform on the first position parameter of the third operation using the first transform parameter of the second non-full-screen window, to generate a second position parameter of the third operation;

a second generation unit configured to generate a third instruction based on the second position parameter;

a first update unit configured to update the graphical buffer data of the application in response to the third instruction;

a second update unit configured to update the first graphical buffer sub-data and the second graphical buffer sub-data based on the updated graphical buffer data.

The first display sub-unit is further configured to combine the updated first graphical buffer sub-data into third frame buffer sub-data, and display the third frame buffer sub-data in the second non-full-screen window of the application; and the second display sub-unit is further configured to combine the updated second graphical buffer sub-data into fourth frame buffer sub-data, and display the fourth frame buffer sub-data in the third non-full-screen window of the application.

Preferably, the electronic device further includes:

a fourth acquisition unit configured to acquire a second operation;

a third generation unit configured to generate a second instruction for closing or hiding the second non-full-screen window based on the second operation; and a first execution unit configured to close or hide the first content of the second non-full-screen window in response to the second instruction.

Preferably, the electronic device further includes:

a judgment unit configured to judge whether the first content of the second non-full-screen window or the second content of the third non-full-screen window satisfies a preset condition;

a second execution unit configured to close or hide the first content or the second content of the third non-full-screen window when the judgment result indicates that the first content or the second content of the third non-full-screen window satisfies the preset condition.

It should be understood that in the embodiments of the present application, the disclosed devices and methods can be implemented in other manners. The device embodiments described above are only illustrative. For example, the division of the units is merely a logical functional division, and in practical applications, there may be other division manners, for example, multiple units or components may be combined or integrated into another system, or some features may be omitted or not performed. In addition, the coupling, direct coupling, or communication connection between various constituent parts displayed or discussed may be implemented by some interfaces, and indirect coupling or communication connections between devices or units may be electrical, mechanical or in another form.

The above units which are described as separate components may or may not be physically separate, and the components displayed as units may be or may not be physical units, i.e., they may be located in one place, or may also be distributed across multiple network units. A part or all of the units can be selected according to actual needs to implement the purpose of the solutions of the present embodiments.

In addition, various functional units according to various embodiments of the present invention may all be integrated into one processing unit, or individual units may also be used as one unit respectively, or two or more units may be integrated into one processing unit. The above integrated units may be implemented in a form of hardware, or may also be implemented in a form of hardware and software functional units.

The ordinary skilled in the art can understand that all or a part of the steps for implementing the above method embodiments can be implemented by hardware related to program instructions. The above programs can be stored in a computer readable storage medium, and when the programs are performed, the steps of the above method embodiments are performed. The above storage medium includes various media which can store program codes, such as a mobile storage device, a Read-Only Memory (ROM), a Random Access Memory (RAM), a disk or a disc.

Alternatively, if the integrated units of the present invention described above are implemented in a form of software functional means and are sold or used as independent products, they can also be stored in a computer readable storage medium. Based on such understanding, the solutions of the embodiments of the present invention substantially or the parts contributing to the conventional technology can be embodied in a form of software product. The computer software product is stored in a storage medium, and includes a number of instructions for enabling a computer device (such as a personal computer, a server or a network device etc.) to perform all or a part of the methods according to various embodiments of the present invention. The storage medium described above includes various media which can store program codes, such as a mobile storage device, a Read-Only Memory (ROM), a Random Access Memory (RAM), a disk or a disc.

The above description is merely specific embodiments of the present invention. However, the protection scope of the present invention is not limited thereto. Those skilled in the art can easily appreciate that all variations or substitutions made within the scope disclosed in the present invention fall into the protection scope of the present invention. Therefore, the protection scope of the present invention should be limited by the protection scope of the claims.

What is claimed is:

1. An information processing method in an electronic device, wherein, the electronic device includes a touch-sensitive display unit and is capable of executing at least one application, the touch-sensitive display unit is capable of displaying at least one window which includes a full-screen window and/or a non-full-screen window smaller than the full-screen window, and the non-full-screen window is obtained by transforming the full-screen window using a transform parameter, the method comprising:

displaying a first window on the touch-sensitive display unit according to a first operation, and starting and executing a first application in the first window;

displaying a second window on the touch-sensitive display unit according to a second operation, and starting and executing a second application in the second window; and in response to detecting that the first window and the second window are in a predetermined relationship and/or that the first application and the second application are in a predetermined relationship, enabling interaction between the first window and the second window;

wherein said enabling interaction between the first window and the second window comprises:

when it is judged that a fifth operation on the touch-sensitive display unit satisfies a preset condition, determining a first transform parameter according to the first window, and determining a second transform parameter according to the second window, wherein the first and second transform parameters each include at least one of a parameter value, a matrix, a group of parameters or a set of parameters, transforming the second window into a third window for substituting the second window using the first transform parameter, so that content of the second window is displayed in the third window, and transforming the first window into a fourth window for substituting the first window using the second transform parameter, so that content of the first window is displayed in the fourth window, wherein a position of the third window on the touch-sensitive display unit is the same as that of the first window on the touch-sensitive display unit, and a position of the fourth window on the touch-sensitive display unit is the same as that of the second window on the touch-sensitive display unit, so that the content of the first window and the content of the second window are exchanged for display.

2. The method of claim 1, wherein the transform parameter is at least one of a parameter value, a matrix, a group of parameters or a set of parameters.

3. The method of claim 2, wherein said enabling interaction between the first window and the second window comprises:

controlling, by the first window, to change a display of content in the second window.

4. The method of claim 3, wherein said controlling, by the first window, to change a display of content in the second window comprises:

acquiring data of the first application executed in the first window, and processing the acquired data of the first application according to a preset condition;

transmitting the processed data to the second application executed in the second window; and displaying, by the second application, new content according the processed data.

5. The method of claim 2, wherein said enabling interaction between the first window and the second window comprises:

enabling data exchange between the first window and the second window.

6. The method of claim 5, wherein said enabling data exchange between the first window and the second window comprises:

acquiring data of the first application executed in the first window, and processing the acquired data of the first application;

transmitting the processed data to the second application executed in the second window;

executing the second application in the second window according to the processed data; and/or, acquiring data of the second application executed in the second window, and processing the acquired data of the second application;

transmitting the processed data to the first application executed in the first window;

executing the first application in the first window according to the processed data.

7. The method of claim 2, wherein said enabling interaction between the first window and the second window comprises:

acquiring first information in the first window according to a third operation in the first window;

in response to a fourth operation on the first information, copying or moving the first information from the first window to the second window;

determining whether the second window satisfies a preset condition; and processing the first information in the second window upon determining that the second window satisfies the preset condition.

8. The method of claim 7, wherein said determining whether the second window satisfies a preset condition comprises:

judging whether the second application executed in the second window is capable of processing of the first information based on an information type of the first information, and if so, determining that the second window satisfies the preset condition.

9. The method of claim 7, wherein said processing the first information in the second window comprises:

the second application automatically loading the first information, and displaying, playing or processing the first information in the second window.

10. The method of claim 2, wherein the preset relationship is established when there is an overlap area between the first window and the second window.

11. The method of claim 1, further comprising: parsing the fifth operation to obtain information about positions of the fifth operation on the touch-sensitive display unit, wherein the information about the positions of the fifth operation includes first coordinates and second coordinates, the first coordinates representing information about a position of a first operating point of the fifth operation, and the second coordinates representing information about a position of a second operating point of the fifth operation;

judging whether the first operating point and the second operating point are located in different windows according to the first coordinates and the second coordinates; and when it is judged that the first operating point and the second operating point are located in different windows, determining a window in which the first operating point is located to be the first window and determining a window in which the second operating point is located to be the second window.

12. The method of claim 10, further comprising:

determining a trajectory of a fifth operation according to information about positions of the fifth operation on the touch-sensitive display unit;

determining a characteristic parameter according to the trajectory;

judging whether the characteristic parameter matches a preset characteristic parameter; and determining that the fifth operation satisfies the preset condition if the characteristic parameter matches the preset characteristic parameter.

13. The method of claim 10, wherein said transforming the second window into a third window for substituting the second window using the first transform parameter comprises:

acquiring image buffer data of content in the second window;

transforming the image buffer data of the content in the second window into image buffer data of the third window using the first transform parameter;

acquiring frame buffer data of a full-screen window of the touch-sensitive display unit using the image buffer data of the third window; and controlling the touch-sensitive display unit to display the third window using the frame buffer data; and said transforming the first window into a fourth window for substituting the first window using the second transform parameter comprises:

acquiring image buffer data of content in the first window;

transforming the image buffer data of the content in the first window into image buffer data of the fourth window using the second transform parameter;

acquiring frame buffer data of a full-screen window of the touch-sensitive display unit using the image buffer data of the fourth window; and controlling the touch-sensitive display unit to display the fourth window using the frame buffer data.

14. An electronic device, comprising a touch-sensitive display unit and a processor, wherein the processor is capable of executing at least one application, and the touch-sensitive display unit is capable of displaying at least one window, which includes a full-screen window and/or a non-full-screen window smaller than the full-screen window, and the non-full-screen window is obtained by transforming the full-screen window using a transform parameter, and the processor is configured to:

display a first window on the touch-sensitive display unit according to a first operation, and start and execute a first application in the first window;

display a second window on the touch-sensitive display unit according to a second operation, and start and execute a second application in the second window; and in response to detecting that the first window and the second window are in a predetermined relationship and/or that the first application and the second application are in a predetermined relationship, enable interaction between the first window and the second window;

wherein said enabling interaction between the first window and the second window comprises:

when it is judged that a fifth operation on the touch-sensitive display unit satisfies a preset condition, determining a first transform parameter according to the first window, and determining a second transform parameter according to the second window, wherein the first and second transform parameters each include at least one of a parameter value, a matrix, a group of parameters or a set of parameters, transforming the second window into a third window for substituting the second window using the first transform parameter, so that content of the second window is displayed in the third window, and transforming the first window into a fourth window for substituting the first window using the second transform parameter, so that content of the first window is displayed in the fourth window, wherein a position of the third window on the touch-sensitive display unit is the same as that of the first window on the touch-sensitive display unit, and a position of the fourth window on the touch-sensitive display unit is the same as that of the second window on the touch-sensitive display unit, so that the content of the first window and the content of the second window are exchanged for display.

* * * * *